United States Patent [19]

Yoshimoto

[11] Patent Number: 4,887,839

[45] Date of Patent: Dec. 19, 1989

[54] AUTOMOTIVE SUSPENSION SYSTEM SUPPRESSIVE OF TOE-OUT CHANGE IN RESPONSE TO LONGITUDINAL SHIFTING OF LOAD

[75] Inventor: Yoshiaki Yoshimoto, Fujisawa, Japan

[73] Assignee: Nissan Motor Co., Ltd., Japan

[21] Appl. No.: 1,899

[22] Filed: Jan. 9, 1987

[30] Foreign Application Priority Data

Jan. 10, 1986 [JP] Japan .................................. 61-3008
Jan. 10, 1986 [JP] Japan .................................. 61-3009
Jul. 30, 1986 [JP] Japan .............................. 61-179363

[51] Int. Cl.⁴ .............................................. B60G 3/00
[52] U.S. Cl. .................................. 280/690; 280/673; 280/701
[58] Field of Search .................. 280/701, 690, 673

[56] References Cited

U.S. PATENT DOCUMENTS

| | | | |
|---|---|---|---|
| 4,269,432 | 5/1981 | Inoue et al. | 280/690 |
| 4,511,160 | 4/1985 | Inoue | 280/701 |
| 4,570,969 | 2/1986 | Tsutsumi et al. | 280/664 |

FOREIGN PATENT DOCUMENTS

| | | | |
|---|---|---|---|
| 76316 | 5/1983 | Japan | 280/701 |
| 71307 | 4/1985 | Japan | 280/673 |
| 116513 | 6/1985 | Japan | 280/690 |

*Primary Examiner*—Kenneth R. Rice
*Attorney, Agent, or Firm*—Leydig, Voit & Mayer

[57] ABSTRACT

An automotive suspension system includes a wheel spindle assembly rotatably supporting a road wheel. The wheel spindle assembly is supported by means of a plurality of lateral or transverse links and a longitudinal link. The longitudinal link is so arranged as to tilt inwardly toward front so that the transverse links are shifted in compliance steer to cooperatively suppress toe angle change or to cause toe-in change.

9 Claims, 23 Drawing Sheets

FIG. 15A

| COMPLIANCE | | TOE-IN |
|---|---|---|
| TRANSVERSE FORCE | fpf | $fpf > 0$ |
| | fpr | $fp < 0$ |

| | | |
|---|---|---|
| 1 | $fpf = \dfrac{\ell \cdot \tan\theta + S_1 - S_3}{\ell_2} \cdot fry$  <br> $fpr = \dfrac{\ell_1 \tan\theta + S_1 - S_3}{\ell_2} \cdot fry$ | 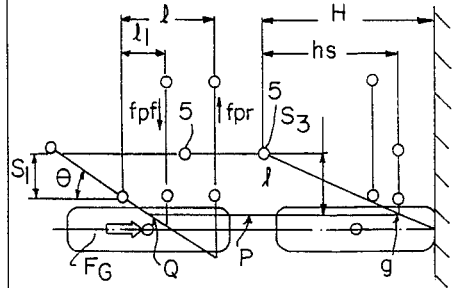 |
| 2 | $fpf = \dfrac{\ell \cdot \tan\theta - S_1}{\ell_2} \cdot fry$ <br> $fpr = \dfrac{\ell_1 \tan\theta - S_1}{\ell_2} \cdot fry$ | 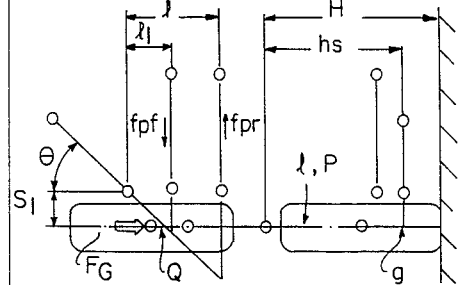 |
| 3 | $fpf = \dfrac{\ell \cdot \tan\theta - S_1 + S_3}{\ell_2} \cdot fry$ <br> $fpr = \dfrac{\ell_1 \cdot \tan\theta - S_1 + S_3}{\ell_2} \cdot fry$ | 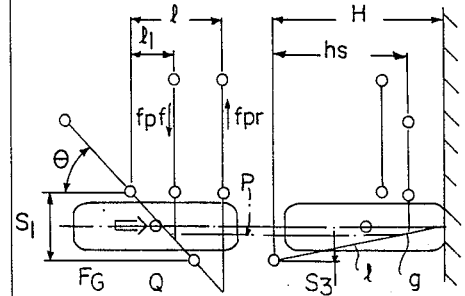 |

FIG. 15B

| COMPLIANCE | | TOE-IN |
|---|---|---|
| TRANSVERSE FORCE | fpf | $f_{pf} > 0$ |
| | fpr | $f_{pr} = 0$ |
| 1 | $f_{pf} = \dfrac{\ell \cdot \tan\theta + S_1 - S_3}{\ell_2} \cdot f_{ry}$  $f_{pr} = \dfrac{\ell_1 \cdot \tan\theta + S_1 - S_3}{\ell_2} \cdot f_{ry}$ | 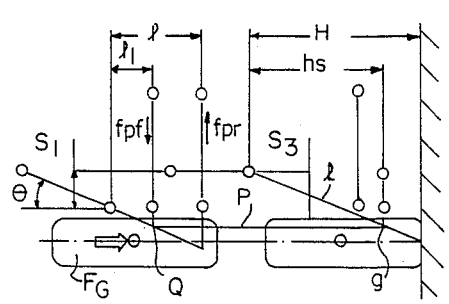 |
| 2 | $f_{pf} = \dfrac{\ell \cdot \tan\theta - S_1}{\ell_2} \cdot f_{ry}$  $f_{pr} = \dfrac{\ell_1 \cdot \tan\theta - S_1}{\ell_2} \cdot f_{ry}$ | 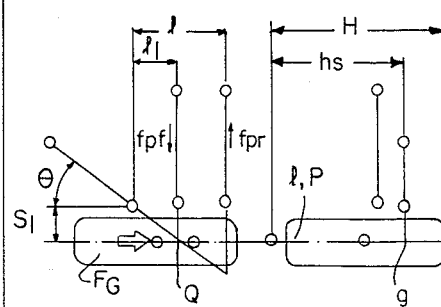 |
| 3 | $f_{pf} = \dfrac{\ell \cdot \tan\theta - S_1 + S_3}{\ell_2} \cdot f_{ry}$  $f_{pr} = \dfrac{\ell_1 \cdot \tan\theta - S_1 + S_3}{\ell_2} \cdot f_{ry}$ | 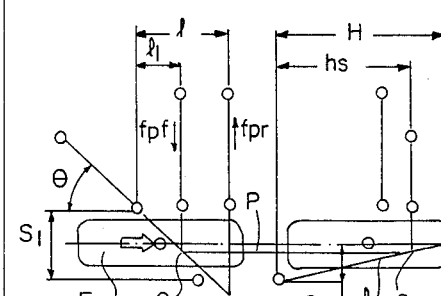 |

FIG. 15C

| COMPLIANCE | | TOE-IN OR TOE-OUT |
|---|---|---|
| TRANSVERSE FORCE | fpf | $f_{pf} > 0$ |
| | fpr | $f_{pr} < 0$ |

| | | |
|---|---|---|
| 1 | $f_{pf} = \dfrac{\ell \cdot \tan\theta + S_1 - S_3}{\ell_2} \cdot f_{ry}$ <br><br> $f_{pr} = \dfrac{\ell_1 \cdot \tan\theta + S_1 - S_3}{\ell_2} \cdot f_{ry}$ | 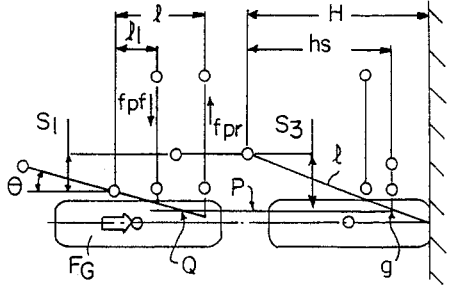 |
| 2 | $f_{pf} = \dfrac{\ell \cdot \tan\theta - S_1}{\ell_2} \cdot f_{ry}$ <br><br> $f_{pr} = \dfrac{\ell_1 \cdot \tan\theta - S_1}{\ell_2} \cdot f_{ry}$ | 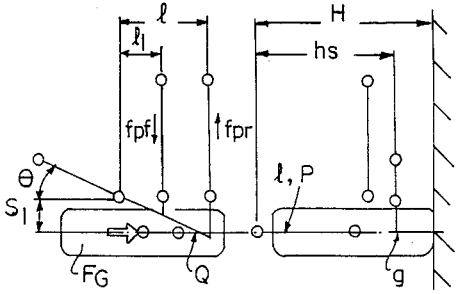 |
| 3 | $f_{pf} = \dfrac{\ell \cdot \tan\theta - S_1 + S_3}{\ell_2} \cdot f_{ry}$ <br><br> $f_{pr} = \dfrac{\ell_1 \cdot \tan\theta - S_1 + S_3}{\ell_2} \cdot f_{ry}$ | 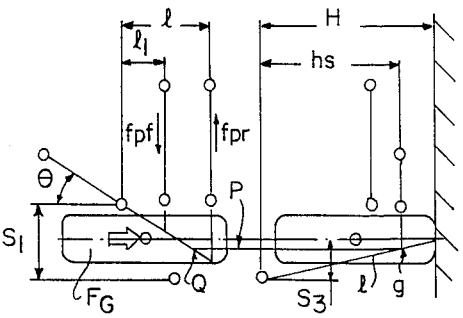 |

FIG. 15D

| COMPLIANCE | | TOE-OUT |
|---|---|---|
| TRANSVERSE FORCE | fpf | $f_{pf} < 0$ |
| | fpr | $f_{pr} < 0$ |

| | | |
|---|---|---|
| 1 | $f_{pf} = \dfrac{\ell \cdot \tan\theta + S_1 - S_3}{\ell_2} \cdot f_{ry}$  $f_{pr} = \dfrac{\ell_1 \cdot \tan\theta + S_1 - S_3}{\ell_2} \cdot f_{ry}$ | |
| 2 | $f_{pf} = \dfrac{\ell \cdot \tan\theta - S_1}{\ell_2} \cdot f_{ry}$  $f_{pr} = \dfrac{\ell_1 \cdot \tan\theta - S_1}{\ell_2} \cdot f_{ry}$ | |
| 3 | $f_{pf} = \dfrac{\ell \cdot \tan\theta - S_1 + S_3}{\ell_2} \cdot f_{ry}$  $f_{pr} = \dfrac{\ell_1 \cdot \tan\theta - S_1 + S_3}{\ell_2} \cdot f_{ry}$ | |

FIG. 18A

| COMPLIANCE | | TOE-IN |
|---|---|---|
| TRANSVERSE FORCE | $f_{pf}$ | $f_{pf} > 0$ |
| | $f_{pr}$ | $f_{pr} > 0$ |
| 1 | $f_{pf} = \dfrac{\ell \cdot \tan\theta + S_1 - S_3}{\ell_2} \cdot f_{ry}$  $f_{pr} = \dfrac{\ell_1 \cdot \tan\theta + S_1 - S_3}{\ell_2} \cdot f_{ry}$ | 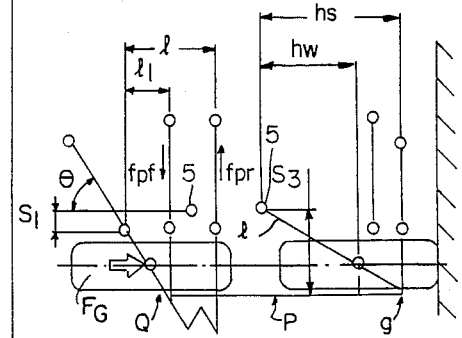 |
| 2 | $f_{pf} = \dfrac{\ell \cdot \tan\theta - S_1}{\ell_2} \cdot f_{ry}$  $f_{pr} = \dfrac{\ell_1 \cdot \tan\theta - S_1}{\ell_2} \cdot f_{ry}$ | 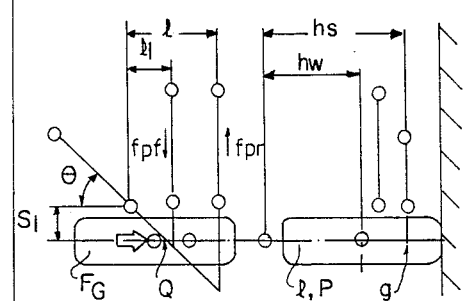 |
| 3 | $f_{pf} = \dfrac{\ell \cdot \tan\theta - S_1 + S_3}{\ell_2} \cdot f_{ry}$  $f_{pr} = \dfrac{\ell_1 \cdot \tan\theta - S_1 + S_3}{\ell_2} \cdot f_{ry}$ | 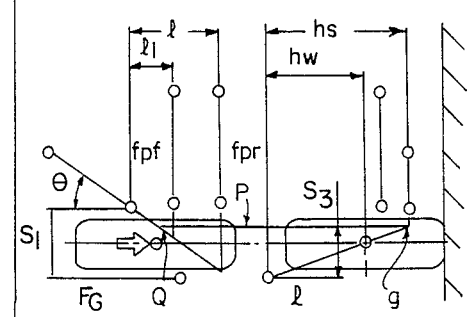 |

FIG. 18B

| COMPLIANCE | | TOE-IN |
|---|---|---|
| TRANSVERSE FORCE | fpf | $fpf > 0$ |
| | fpr | $fpr = 0$ |
| 1 | $fpf = \dfrac{\ell \cdot \tan\theta + S_1 - S_3}{\ell_2} \cdot fry$ <br><br> $fpr = \dfrac{\ell_1 \cdot \tan\theta + S_1 - S_3}{\ell_2} \cdot fry$ | 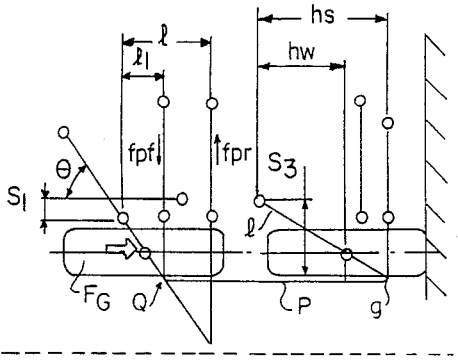 |
| 2 | $fpf = \dfrac{\ell \cdot \tan\theta - S_1}{\ell_2} \cdot fry$ <br><br> $fpr = \dfrac{\ell_1 \cdot \tan\theta - S_1}{\ell_2} \cdot fry$ | 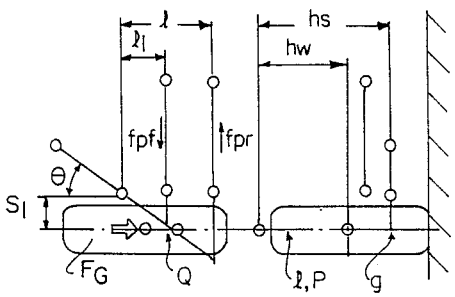 |
| 3 | $fpf = \dfrac{\ell \cdot \tan\theta - S_1 + S_3}{\ell_2} \cdot fry$ <br><br> $fpr = \dfrac{\ell_1 \cdot \tan\theta - S_1 + S_3}{\ell_2} \cdot fry$ | 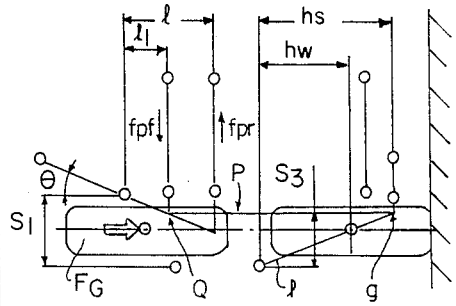 |

FIG. 18C

| COMPLIANCE | | TOE-IN OR TOE OUT |
|---|---|---|
| TRANSVERSE FORCE | $f_{pf}$ | $f_{pf} > 0$ |
| | $f_{pr}$ | $f_{pr} < 0$ |
| 1 | $f_{pf} = \dfrac{\ell \cdot \tan\theta + S_1 - S_3}{\ell_2} \cdot f_{ry}$  $f_{pr} = \dfrac{\ell_1 \cdot \tan\theta + S_1 - S_3}{\ell_2} \cdot f_{ry}$ | 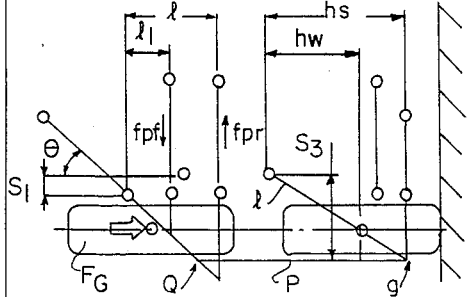 |
| 2 | $f_{pf} = \dfrac{\ell \cdot \tan\theta - S_1}{\ell_2} \cdot f_{ry}$  $f_{pr} = \dfrac{\ell_1 \cdot \tan\theta - S_1}{\ell_2} \cdot f_{ry}$ | 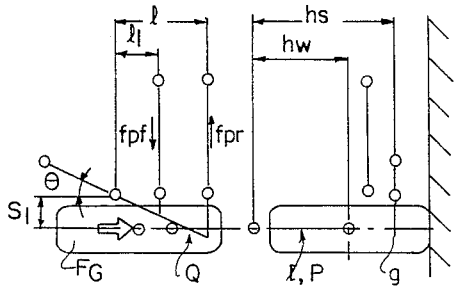 |
| 3 | $f_{pf} = \dfrac{\ell \cdot \tan\theta - S_1 + S_3}{\ell_2} \cdot f_{ry}$  $f_{pr} = \dfrac{\ell_1 \cdot \tan\theta - S_1 + S_3}{\ell_2} \cdot f_{ry}$ | 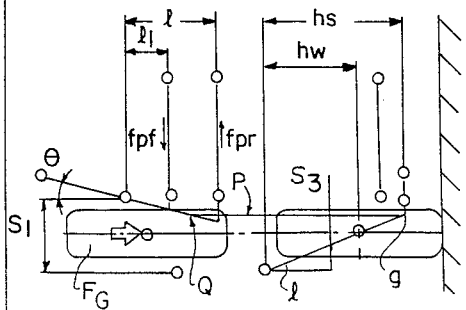 |

FIG. 18D

| COMPLIANCE | | TOE-OUT |
|---|---|---|
| TRANSVERSE FORCE | fpf | $fpf < 0$ |
| | fpr | $fpr < 0$ |

| | | |
|---|---|---|
| 1 | $fpf = \dfrac{\ell \cdot \tan\theta + S_1 - S_3}{\ell_2} \cdot fry$ $fpr = \dfrac{\ell_1 \cdot \tan\theta + S_1 - S_3}{\ell_2} \cdot fry$ | |
| 2 | $fpf = \dfrac{\ell \cdot \tan\theta - S_1}{\ell_2} \cdot fry$ $fpf = \dfrac{\ell_1 \cdot \tan\theta - S_1}{\ell_2} \cdot fry$ | |
| 3 | $fpf = \dfrac{\ell \cdot \tan\theta - S_1 + S_3}{\ell_2} \cdot fry$ $fpr = \dfrac{\ell_1 \cdot \tan\theta - S_1 + S_3}{\ell_2} \cdot fry$ | |

AUTOMOTIVE SUSPENSION SYSTEM SUPPRESSIVE OF TOE-OUT CHANGE IN RESPONSE TO LONGITUDINAL SHIFTING OF LOAD

BACKGROUND OF THE INVENTION

1. Field of the Invention

The present invention relates generally to a suspension system for an automotive vehicle. More specifically, the invention relates to an automotive suspension system which can suppress toe-out change or cause toe-in change in response to shifting of gravity center of the vehicle, which causes vehicular pitching motion.

2. Description of the Prior Art

An independent-type suspension system which constitute background art to the present invention, has been disclosed in the Japanese Utility Model First Publication (Jikkai) Showa 57-141109, published on Sept. 4, 1982. In the shown structure, a wheel spindle assembly rotatably supports a vehicular wheel. The wheel spindle assembly is associated with link mechanism which is connected to a vehicle body. The link mechanism comprises transverse members which extends transversely to the longitudinal axis of the vehicle to determine the transverse position of the wheel spindle assembly. The link mechanism further comprises a longitudinal member extending longitudinally in substantially parallel to the longitudinal axis of the vehicle. Similarly to the aforementioned transverse members, the longitudinal member determines the longitudinal position of the wheel spindle assembly. The transverse and longitudinal members are cooperated with rubber bushings or so forth for elastically or resiliently absorbing vibration to be transmitted from a road wheel to the vehicle body.

The bushings provided in the link mechanism will raise problem of compliance steering. For instance, when vehicle is running in engine braking state to decelerate the vehicle, vehicular gravity center shifts rearwardly to exert rearward force to a wheel axle. At this condition, due to presence of moment of the rearward force, the bushings are deformed to cause compliance steer in toe-out direction. As a result, driving stability of the vehicle tends to be distroied to cause lateral slip at the rear. In order to prevent the vehicular suspension system to fall into unstable driving condition even when the gravity center is shifted rearwardly, the stiffness of the bushings has to be increased. Stiffening the bushing will drop vibration absorbing characteristics. In addition, stiffening the bushing will increase stiffness of the suspension system to increase tendency of giving rough-ride feeling for the driver and/or the passangers riding in the vehicle.

SUMMARY OF THE INVENTION

It is therefore an object of the present invention to provide an automotive suspension system which achieves both of driving stability and riding comfort.

Another and more specific object of the invention is to provide an automotive suspension system which can suppress toe-out change in compliance steer without causing increasing of stiffness of suspension system.

A further object of the invention is to provide a novel and improved suspension geometry which allows suppressing of toe-out change when force is exerted along longitudinal axis of the vehicle.

In order to accomplish the aforementioned and other objects, an automotive suspension system, according to the invention, includes a wheel spindle assembly rotatably supporting a road wheel. The wheel spindle assembly is supported by means of a plurality of lateral or transverse links and a longitudinal link. The longitudinal link is so arranged as to tilt inwardly toward front so that the transverse links are shifted in compliance steer to cooperatively suppress toe angle change or to cause toe-in change.

According to one aspect of the invention, an automotive suspension system comprises a first member rotatably supporting a road wheel, a second member connecting the first member to a vehicle body, the second member having a first end rigidly connected to the first member and a second end connected to the vehicle body via a first elastic member, the second member having an axis crossing the vehicle body at a first point, a plurality of transversely extending third members each being connected to the first member at a first end and to the vehicle body at a second end for determining transverse position of the first member, each of the third members being connecting the first member and the vehicle body via second elastic members provided at the first and second ends thereof, and a fourth member having a first end connected to the first member and a second end connected to the vehicle body for determining longitudinal position of the first member, the second end being so oriented to direct an axis of the fourth member to cross transversely extending axes of respective third members at positions transversely shifted from the first point at magnitudes greater than given values, and whereby suppressing toe angle change or causing toe-in change in compliance steer.

In one embodiment, the fourth members are so directed as to suppress toe angle change or to cause toe-in change in compliance steer caused by exerting longitudinal force on a wheel center about which the road wheel rotates. In the alternative, the fourth members are so directed as to suppress toe angle change or to cause toe-in change in compliance steer caused by exerting longitudinal force on a wheel tread at which the road wheel contacts with a road surface.

The third members comprises a front and rear links extending essentially in transverse directions, and the fourth member is so oriented to direct the axis thereof to cross with a line extending through the first point and a point on which the longitudinal force is exerted at a position longitudinally front side of extension of an axis of the rear link.

BRIEF DESCRIPTION OF THE DRAWINGS

In the drawings:

FIGS. 15(A), 15(B), 15(C) and 15(D) are explanatory illustration showing variation of suspension geometries which will affect toe angle while a longitudinal force exerts at the wheel center;

FIGS. 18(A), 18(B), 18(C) and 18(D) are explanatory illustration showing variation of suspension geometries which will affect toe angle while a longitudinal force exerts at a tread of wheel.

DESCRIPTION OF THE PREFERRED EMBODIMENT

Figure 1:
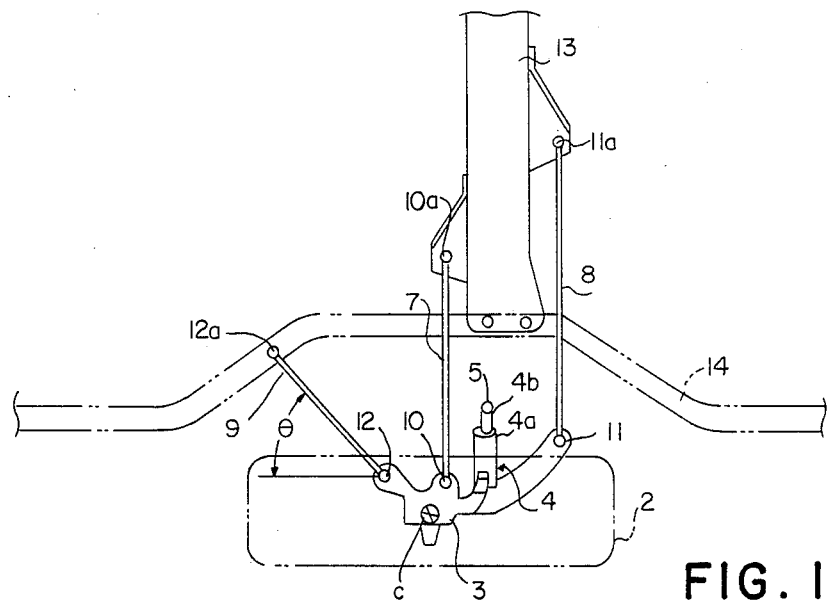
FIG. 1 is a plan view of the first embodiment of an automotive suspension system according to the present invention, which is applied to a multi-link type strut suspension.
Figure 2:
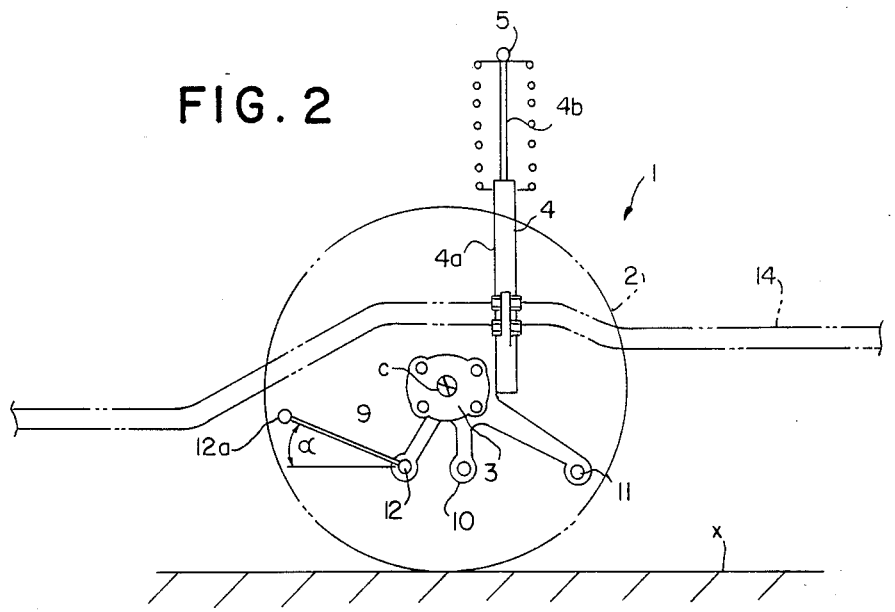
FIG. 2 is a side elevation of the first embodiment of the automotive suspension system of FIG. 1.

Referring now to the drawings, particularly FIGS. 1 and 2, the first embodiment of an automotive suspension system, according to the invention, is applied to a multilink type strut suspension system. The strut suspension system 1 includes a wheel spingle 3, on which a road wheel 2 is rotatably mounted. The wheel spindle 3 is fixedly mounted on the lower end of a strut assembly 4. The upper end of the strut assembly 4 is connected to a vehicle body (not shown) via an insulator or bushing 5. The center axis of the insulator 5 serves as crossing-point of a rotary axis of the wheel spindle 3 and the vehicle body. As is well known, the strut assembly 4 comprises a shock absorber (not shown) including a piston reciprocating along an axis of a shock absorber housing, which axis is common to suspension strut 4a. The piston is fixed to the lower end of a piston rod 4b which extends upwardly through the upper end of the suspension strut 4a to be connected to the vehicle body through the insulator 5. On the other hand, the wheel spindle 3 is fixedly connected to the lower end of the suspension strut 4a.

The suspension system also includes front and rear transverse links 7 and 8 which serve as transversely positioning members and a radius-rod 9 which serves as longitudinally positioning member. The front and rear transverse links 7 and 8 and the radius-rod 9 also connect the wheel spindle 3 to the vehicle body. Rubber bushings 10, 10a, 11, 11a and 12, 12a are provided respective ends of the front and rear transverse links 7 and 8 and the radius-rod 9. As will be seen from FIG. 1, the inner ends of the front and rear transverse links 7 and 8 are connected to a cross member 13 of a vehicular framework through brackets and the rubber bushings 10a and 11a. The rubber bushings 10a and 11a are deformable to allow respectively associated links 7 and 8 to pivot in vertical direction and horizontally in longitudinal direction of the vehicle as a force being exerted to the links. On the other hand, an inner and front end of the radius-rod 9 is connected to a side frame 14 of the vehicular framework via the rubber bushing 12a. The rubber bushing 12a is deformable in vertical direction and in horizontally transverse direction of the vehicle.

The radius-rod 9 is so arranged as to define an angle $\theta$ with a longitudinal axis of the vehicle to position the inner and the front end thereof with the rubber bushing 12a at a position inwardly shifted from the transverse position of the rubber bushing 12 which is interposed between the wheel spindle 3 and the outer end of the radius-rod 9. Furthermore, the inner and front end of the radius-rod 9 is upwardly shifted from the plane on which the outer and rear end of the radius-rod 9 lies, so that the radius-rod vertically inclines toward rear at an angle $\alpha$ respect to a horizontal plane X.

It should be appreciated that the inner and front end of the radius-rod 9 with the rubber bushing 12a is connected to the upwardly bent section of the side member 14, which bent section extends along a tire house of the vehicle body. With this arrangement, tilting of the radius-rod 9 at an angle $\alpha$ cannot affect to the vehicle floor construction which otherwise causes necessity of bending of the floor upwardly to reduce the space of vehicle comparatment.

The operation of the first embodiment of the automotive suspension system of FIGS. 1 and 2 will be discussed with reference to FIGS. 3 and 4. It is assumed that a longitudinal force $F_G$ which is exerted on the wheel center C corresponding to transversely extending axis of the wheel spindle 3, due to engine braking and so forth. Since the radius-rod 9 is horizontally inclined at the angle $\theta$ relative to the longitudinal axis of the vehicle, an inward component $f_{rx}$ of a force $f_r$ exerts on the radius-rod 9 to determine load distribution between the front and rear transverse links 7 and 8 to determine moment for toe angle change of the road wheel 2. Therefore, according to the present invention, the angle $\theta$ of the radius-rod 9 is set to suppress compliance steer or to cause toe-in change in response to the longitudinal force $F_G$.

Namely, as set forth above, the wheel spindle 3 is supported and is determined the transverse position by the front and rear transverse links 7 and 8. The front and rear transverse links 7 and 8 are connected to the cross member 13 via the rubber bushings 10a and 11a. Therefore, transverse shifting of the front and rear transverse links 7 and 8 are caused by deformation of these rubber bushings 10, 10a and 11, 11a in transverse direction. Accordingly, shifting magnitude of the front and rear transverse links 7 and 8 is variable depending upon magnitude of deformation of the rubber bushings 10, 10a and 11, 11a. Deformation magnitude of the rubber bushings 10, 10a and 11, 11a are variable depending upon the transverse forces $f_{pf}$ and $f_{pr}$ exerted on the front and rear transverse links.

Since the toe angle of the road wheel 2 is maintained at neutral position as long as the transverse forces $f_{rx}$ and $f_{pr}$ are held even. On the other hand, when the balance of the transverse forces $f_{rx}$ and $f_{pr}$ is destroyed, transverse deformation magnitude of the bushings 12a and 11a become different to each other to cause toe change. When, the transverse force $f_{rx}$ is greater than the transverse force $f_{pr}$, deformation magnitude of the rubber bushing 12a become greater than that of the rubber bushing 11a to cause tow-in change, in general sense. On the other hand, when the transverse force $f_{pr}$ is greater than the transverse force $f_{rx}$, deformation magnitude of the rubber bushing 11a becomes greater than that of the rubber bushing 12a to cause toe-out change. Therefore, in order to suppress toe change, the transverse forces $f_{rx}$ and $f_{pr}$ generated in response to the longitudinal force $F_G$ has to be maintained substantially even. On the other hand, in order to cause toe-in change in response to the longitudinal force $F_G$, the transverse force $f_{rx}$ to be exerted on the radius-rod 9 has to be greater than the transverse force $f_{pr}$ to be exerted on the rear transverse link 8.

In further detail, the transverse force $f_{pf}$ to be exerted on the front transverse link 7 and the transverse force $f_{pr}$ to be exerted on the rear transverse link 8 are derived as follow.

In FIG. 2:

l represents a distance in longitudinal direction between the axes of the rubber bushings 12 and 11;

$l_1$ represents a distance in longitudinal direction between the rubber bushings 12 and 10;

$l_2$ represents a distance in longitudinal direction between rubber bushings 10 and 11;

$l_{pf}$ and $l_{pr}$ respectively represent distance in longitudinal direction between the rubber bushing 10 and the insulator 5 and between the insulator 5 and the rubber bushing 11;

$S_1$ represents a distance in transverse direction between the rubber bushing 12 and the insulator 5;

$S_2$ represents a distance in transverse direction between the insulator 5 and the wheel center C;

H represents a distance in vertical direction from the road surface X to the insulator 5;

$h_s$ and $h_r$ respectively represent distance in vertical direction between the rubber bushing 12 and the insulator 5 and between the rubber bushing 12 and the road surface X;

$h_w$ and $h_p$ respectively represent distances in vertical direction between the insulator 5 to the wheel center C and between the insulator 5 to the rubber bushings 10 and 11;

$f_r$, $f_{pf}$, $f_{pr}$, $f_s$ and $f_{sx}$ are forces to be exerted on the radius-rod 9, front transverse link 7, rear transverse link 8, strut assembly 4 respectively.

Figure 3:
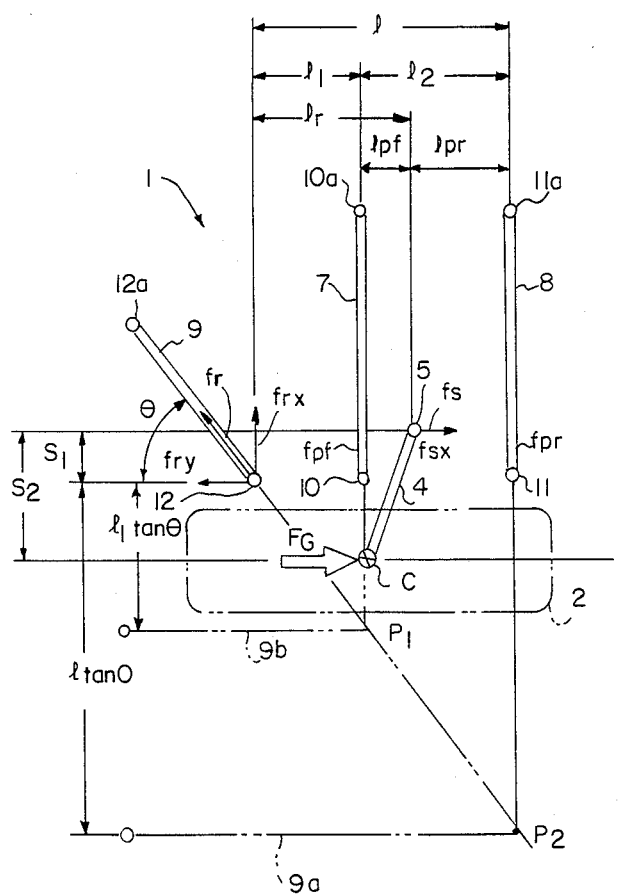
FIG. 3 is a fragmentary and explanatory plan view of the first embodiment of the automotive suspension system of FIG. 1.
Figure 4:
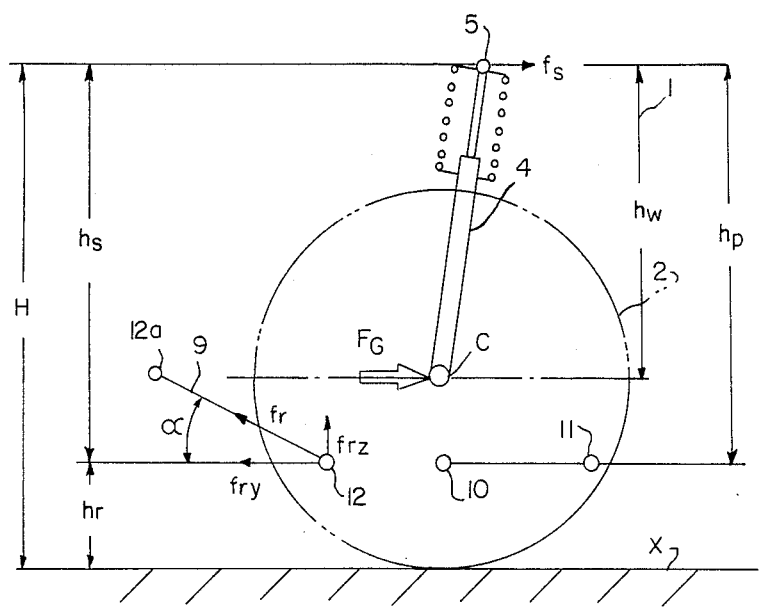
FIG. 4 is a fragmentary and explanatory side elevation of the first embodiment of the automotive suspension system of FIG. 1.

As will be appreciated from FIGS. 3 and 4, since the radius-rod 9 inclines transversely and vertically at respective angles $\theta$ and $\alpha$, longitudinal and transverse components $f_{rx}$ and $f_{ry}$ and vertical component $f_{rz}$ are created by the force $f_r$ exerted on the radius-rod 9.

Based on the aforementioned condition, the rotational moment around the connecting point between the strut assembly 4 and the vehicle body, i.e. around the insulator 5 can be illustrated by the following equation. It should be noted that, in the following discussion, rotational magnitude in clockwise direction on the drawings will be referred to by positive value and rotational magnitude in counterclockwise direction will be referred to by negative value.

$$-l_{pf}f_{pf}-l_{pr}f_{pr}+l_r f_{rx}+S_1 \cdot f_{ry}-S_2 \cdot F_G=0 \quad (1)$$

On the other hand, balance of the transverse force can be illustrated by the following equation. In the equation, the force outwardly directed is represented by positive value and the force inwardly directed is represented by negative value.

$$f_{pf}-f_{pr}+f_{sx}-f_{rx}=0 \quad (2)$$

where $$f_{rx}=\tan \theta \cdot f_{ry} \quad (3)$$

As will be seen from FIG. 3, $$l_{pf}+l_{pr}=l_2;$$

$$l_{pr}+l_r=l;$$

and $$l_r+l_{pf}=l_1.$$

Based on this dimentional relationship and the aforementioned equations (1), (2) and (3), the foreces $f_{pf}$ and $f_{pr}$ to be exerted on the front and rear transverse links 7 and 8 respectively are illustrated by the following formula:

$$f_{pf}=\frac{l \cdot \tan \theta + S_1) \cdot f_{ry} - f_{sx} \cdot l_{pr} - F_G \cdot S_2}{l_2} \quad (4)$$

$$f_{pr}=\frac{l_1 \cdot \tan \theta + S_1) \cdot f_{ry} - f_{sx} \cdot l_{pf} - F_G \cdot S_2}{l_2} \quad (5)$$

Here, in order to suppress toe angle change or to cause toe-in change in response to the force $F_G$ exerted on the wheel center C, the transverse force $f_{pf}$ to be exerted on the front transverse link 7 has to be positive or zero and the transverse force $f_{pr}$ to be exerted on the rear transverse link 8 also has to be positive or zero. Therefore, condition is derived from the aforementioned equation (4):

$$l \cdot \tan \theta + S_1) \cdot f_{ry} - f_{sx} \cdot l_{pr} - F_G \cdot S_2 \geq 0 \quad (6)$$

and, from the aforementioned equation (5):

$$l_1 \cdot \tan \theta + S_1) \cdot f_{ry} - f_{sx} \cdot l_{pf} - F_G \cdot S_2 \geq 0 \quad (7)$$

are required.

In order to analize the aforementioned formula (6) and (7), $f_{sx}$ and $F_G$ are derived. As seen from FIG. 4, the rotational moment around the insulator 5 of the strut assembly 4 in frontward direction is illustrated by the following equation:

$$h_s f_{ry}+l_r f_{rs}-h_w \cdot F_G=0 \quad (8)$$

where $$f_{rz}=\tan \alpha \cdot f_{ry} \quad (9).$$

Based on the above equations (8) and (9), it is derived:

$$F_G = \frac{h_s + \tan \alpha \cdot l_r}{h_w} \quad (10)$$

On the other hand, the rotational moment around the insulator 5 in rearward direction can be illustrated by the following equation:

$$h_p f_{ry} + l_r f_{rz} - h_w F_G = 0 \quad (11).$$

From the equation (11) and fomula (2), (3) and (9), $$f_{sx} = \frac{[S_1 \cdot \tan \alpha + (h_p - h_s) \cdot \tan \theta]}{h_p} \cdot f_{ry} \quad (12)$$

The formula (11) and (12) can be modified by utilizing formula (6) and (7) to:

$$(l \cdot \tan \theta + S_1) \geqq \quad (13)$$

$$\left[ \frac{S_1 \cdot \tan \alpha + (h_p - h_s) \cdot \tan \theta}{h_p} \cdot l_{pr} \right] +$$

$$\left[ \frac{h_s + l_r \cdot \tan \alpha}{h_w} \cdot S_2 \right]$$

$$(l_1 \cdot \tan \theta + S_1) \geqq \left[ \frac{h_s + l_r \cdot \tan \alpha}{h_w} \cdot S_2 \right] - \quad (14)$$

$$\left[ \frac{S_1 \cdot \tan \alpha + (h_p - h_s) \cdot \tan \theta}{h_p} \cdot l_{pf} \right]$$

As will be appreciated from the discussion set forth above, if the front and rear transverse links 7 and 8 and the radius-rod 9 are arranged in order to satisfy the formula (13) and (14), toe out change can be suppressed or more positively toe-in change is caused in response to the longitudinal force $F_G$.

It should be appreciated that, in the foregoing equation (13), (l·tan $\theta + S_1$) indicates a distance in transverse direction between a crossing point $P_2$ of extensions of axes of radius-rod 9 and the rear transverse link 8 and the insulator 5, as shown in FIG. 3. Also, in the equation (14), (l$_1$·tan $\theta + S_1$) indicates a distance in transverse direction between a crossing point $P_1$ of extensions of axes of the radius-rod 9 and the front transverse link 7 and the insulator 5. From this, it would be appreciated that, against the axial load exerted on the front transverse link 7, imaginary radius-rod 9a extends frontwardly from the point $P_2$. Similarly, it can be considered that against the axial load exerted on the rear transverse link 8, imaginary radius-rod 9a frontwardly extends from the point $P_1$. By setting the distances (l·tan $\theta + S_1$) between the point $P_2$ to the insulator and (l$_1$·tan $\theta + S_1$) between the point $P_1$ to the insulator to satisfy the foregoing equations (13) and (14), suppression of toe angle change or toe-in change can be achieved.

In another approach, a condition not to cause toe angle change can be derived with respect to the horizontal tiltt angle $\theta$ of the radius-rod 9 relative to the longitudinal force $F_G$. In this view, the toe angle change will never occur as long as the transversely outward force $f_{pf}$ to be exerted on the front transverse link 7 balances with the transversely inward force $-f_{pr}$ to be exerted on the rear transverse link 8. As long as this balance is established, the condition of the transverse forces may be illustrated by:

$$f_{pf} = |-f_{pr}| \quad (16)$$

On the other hand, foregoing formula (4) and (5) can be modified by utilizing the formula (10) and (12) as follows:

$$f_{pf} = \frac{\left[ l \cdot \tan \theta + S_1 - \left( \frac{S_1 \cdot \tan \alpha + (h_p - h_s) \cdot \tan \theta}{hp} \cdot l_{pr} \right) - \frac{(h_s + l_r \cdot \tan \alpha) \cdot S_2}{h_w} \right] f_{ry}}{l_2} \quad (17)$$

$$f_{pr} = \frac{\left[ \frac{S_1 \cdot \tan \alpha + (h_p - h_s) \tan \theta}{hp} \cdot l_{pf} + l_1 \cdot \tan \theta + S_1 - \frac{(h_s + l_r \cdot \tan \alpha) \cdot S_2}{h_w} \right] \cdot f_{ry}}{l_2} \quad (18)$$

By modifying the formula (17) and (18) utilizing the formula (16), there can be obtained:

$$\left[ l + l_1 + l_{pf} - l_{pr} + \frac{h_S}{h_p} (l_{pr} - l_{pf}) \right] \cdot \tan \theta = \quad (19)$$

$$\frac{S_1 \cdot \tan \alpha}{h_p} (l_{pr} - l_{pf}) + 2 \left[ \frac{(h_s + l_r \cdot \tan \alpha) \cdot S_2}{h_w} - S_1 \right]$$

Here, since $l - l_{pr} = l_r l_1 + l_{pf} = l_r$, the foregoing formula (19) can be modified to:

$$\theta = \quad (20)$$

$$\tan^{-1} \frac{\frac{S_1 \cdot \tan \alpha}{hp} (l_{pr} - l_{pf}) + 2 \left[ \frac{(h_s + l_r \cdot \tan \alpha) S_2}{h_w} - S_1 \right]}{2 \cdot l_r + \frac{h_s}{hp} \cdot (l_{pr} - l_{pf})}$$

Therefore, by setting the tilting angle $\theta$ of the radius-rod 9 to satisfy the equation (20), toe angle change can be suppressed. In addition, in order to obtain toe-in change, the former equation $f_{pf} = |-f_{pr}|$ has to be modified to $f_{pf} > |-f_{pr}|$. Therefore, by setting the angle $\theta$ to be greater than that derived from the equation (20), toe-in change characteristics can be obtained.

Figure 5:
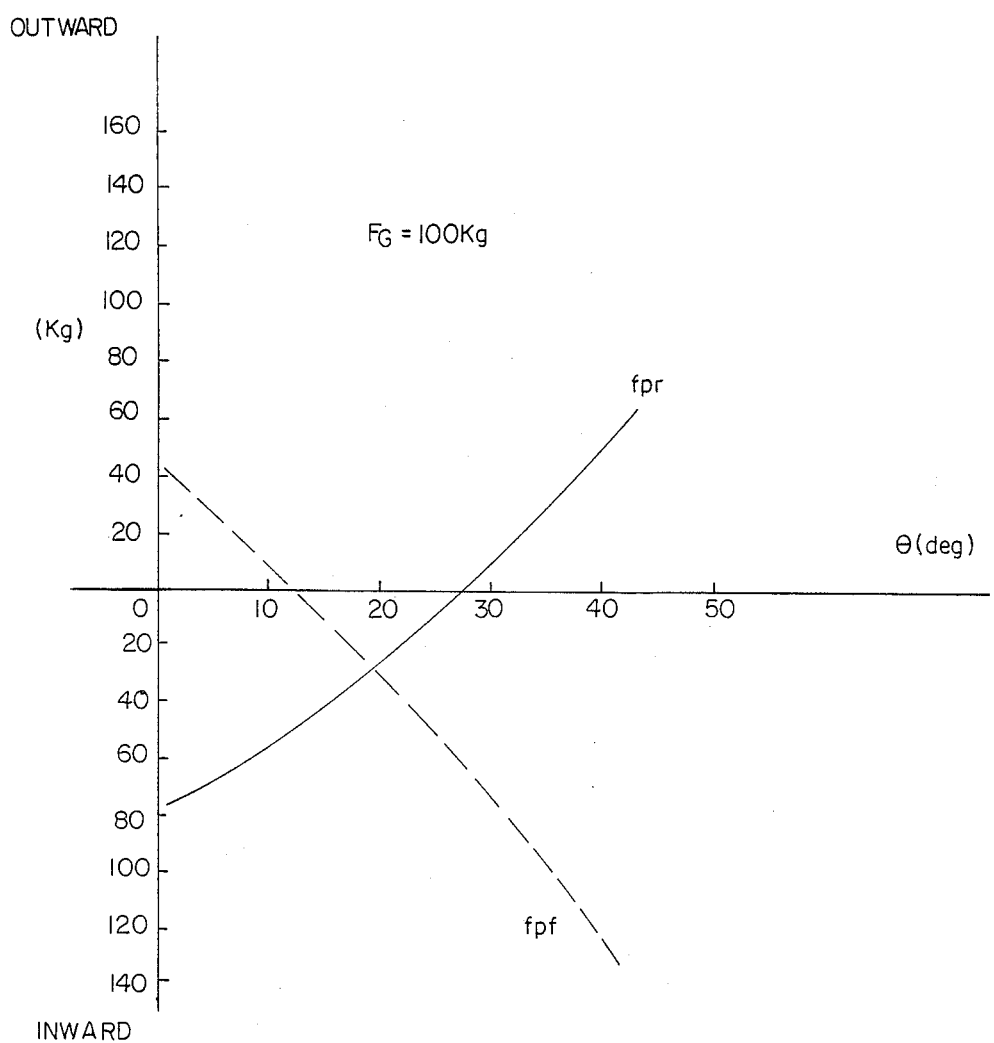
FIG. 5 is a graph showing relationship between an angle of a radius-rod and force to be exerted on transverse links.

FIG. 5 shows relationship between the horizontal angle $\theta$ of the radius-rod 9 and the axial loads at the front and rear transverse links 7 and 8, in terms of 100 kg of longitudinally force being applied to the wheel center C. In FIG. 5, the axial load on the rear transverse link 8 is illustrated in solid line and axial load on the front transverse link 7 is illustrated in broken line.

Figure 6A:
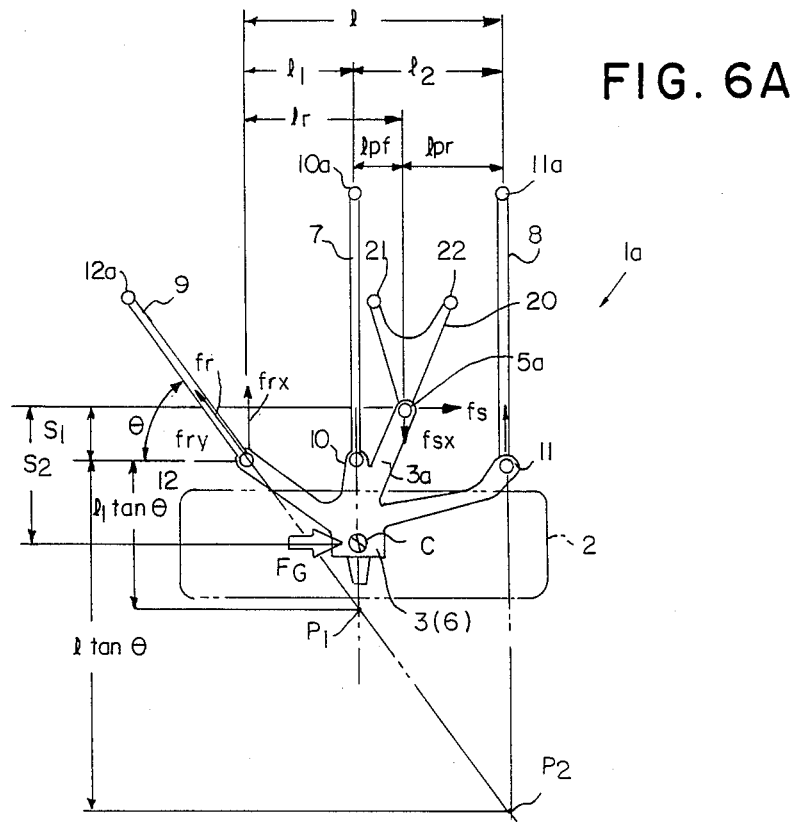
FIGS. 6(A) and 6(B) are fragmentary and explanatory plan views of the second embodiment of an automotive suspension system according to the invention.
Figure 6B:
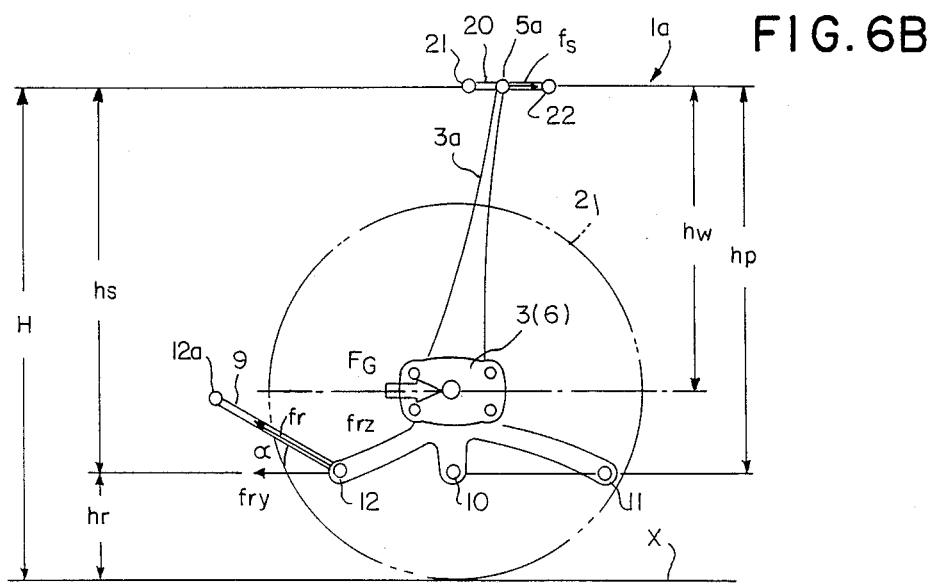
Figure 7A:
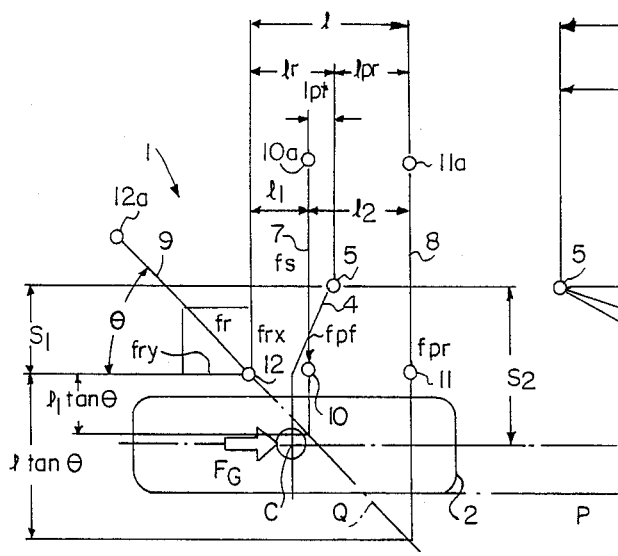
FIGS. 7(A), 7(B) and 7(C) are fragmentary and explanatory side elevations of the second embodiment of the automotive suspension system of FIG. 6.
Figure 7B:
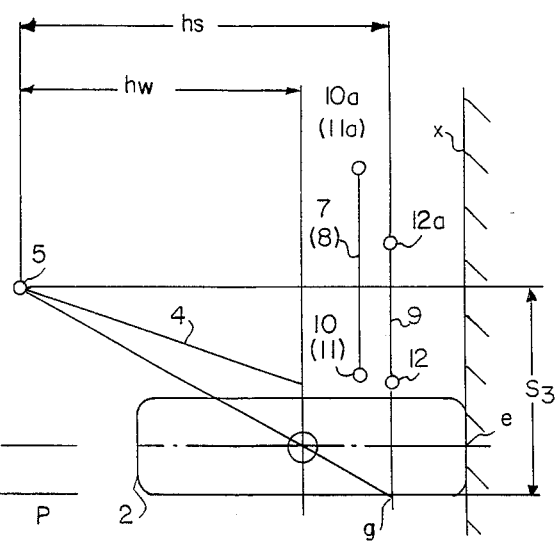
Figure 7C:
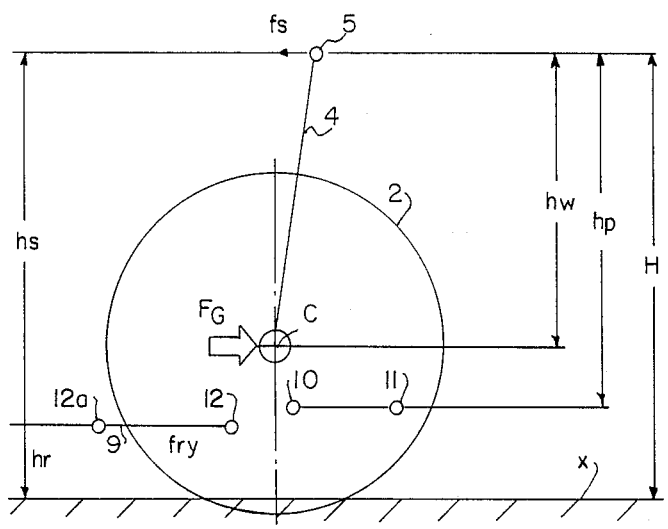

FIGS. 6 and 7 show the second embodiment of the automotive suspension system according to the invention. This embodiment illustrates application of the suspension geometry according to the invention to a double wishbone type suspension system. In this embodiment, the wheel spindle 3 is provided with an upward extension 3a extending from the major portion from which a spindle extends transversely. The top end of the upward extension 3a is connected to an upper arm 20 via a rubber bushing or insulator 5a. On the other hand, the upper arm 20 is connected to the vehicle body through rubber bushings 21 and 22. However, these bushings 21 and 22 are not always required as long as the vibration input from the road wheel 2 can be satisfactorily absorbed by the rubber bushing 5a. In this embodiment, the front and rear transverse links 7 and 8 and the radius-rod 9 are provided to connect the major portion of the wheel spindle 3 in substantially same construction as that described with respect to the foregoing first embodiment. In this embodiment, the geometry of the front and rear transverse links 7 and 8 and the radius-rod 9 is set to satisfy the equations (13) and (14).

The following table show the toe angle change in compliance steer to be occured in response to the longitudinal force $F_G$ in the foregoing first and second embodiments.

TABLE

|  |  | $f_{pr}$ | | |
|---|---|---|---|---|
|  |  | $f_{pr}>0$ | $f_{pr}=0$ | $f_{pr}<0$ |
| $f_{pf}$ | $f_{pf}>0$ | TOE-IN *1 | TOE-IN *1 | *2 |
|  | $f_{pf}=0$ | TOE-IN *3 | NEUTRAL | TOU-OUT *3 |
|  | $f_{pf}<0$ | *2 | TOE-OUT *4 | TOE-OUT *4 |

*1: When spring coefficients of front and rear transverse links 7 and 8 are ∞, NEUTRAL steer is maintained.
*2: Toe change characteristcs will be determined depending upon axial load and spring coefficients of the front and rear transverse links in axial directions.
*3: When spring coefficient of the rear transverse link 8 is ∞, NEUTRAL steer is maintained.
*4: When spring coefficient of the front transverse link 7 is ∞, NEUTRAL steer is maintained.

As will be appreciated herefrom, as long as the positive transverse force (outward force=$f_{pf}>0$) is exerted on the front transverse link 7 and/or the negative transverse force (inward force=$f_{pr}<0$) is exerted on the rear transverse link 8, or when the transverse force $F_{pf}$ is zero and the transverse force to be exerted on the rear transverse link 8 is positive, toe angle change in compliance steer becomes toe-in. By providing toe-in change characteristics in compliance steer, satisfactory driving stability can be provided. On the other hand, when the negative transverse force (inward force=$f_{pf}<0$) is exerted on the front transverse link 7 and/or the positive transverse force (outward force=$f_{pr}>0$) is exerted on the rear transverse link 8, toe angle change characteristics in compliance steer becomes toe-out to degrade driving stability. On the other hand, when transverse forces $f_{pf}$ and $f_{pr}$ are exerted on the front and rear transverse links 7 and 8 in mutually oppositie directions, toe angle change characteristics may be determined by the spring or elastic coefficients of the rubber bushings 10, 10a, 11 and 11a. Therefore, by adjusting the elastic characteristics of the rubber bushings 10, 10a, 11 and 11a, compliance steer characteristics can be adjusted to be maintained at NEUTRAL steer or toe-in characteristics.

Variations or modifications of the first embodiment of the suspension system according to the invention will be briefly discussed with reference to FIGS. 8(A) through 10(C).

Figure 8A:
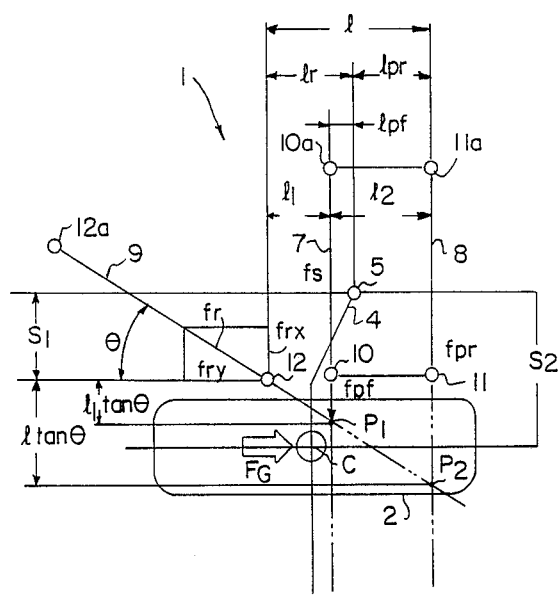
FIGS. 8(A), 8(B) and 8(C) are illustration showing a mofitication of the first embodiment of the automotive syspension system of FIG. 1.
Figure 8C:
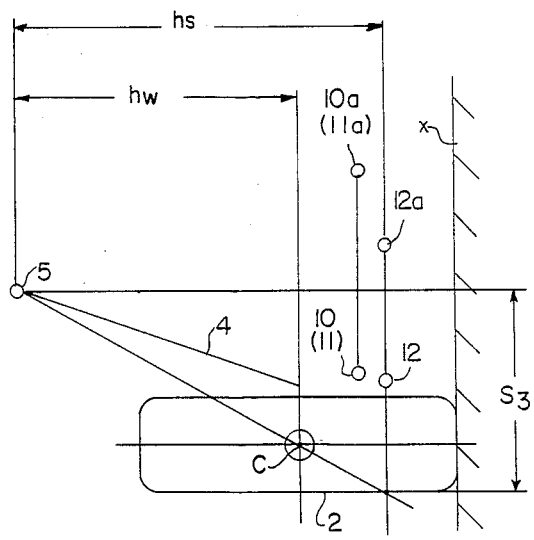
Figure 8B:
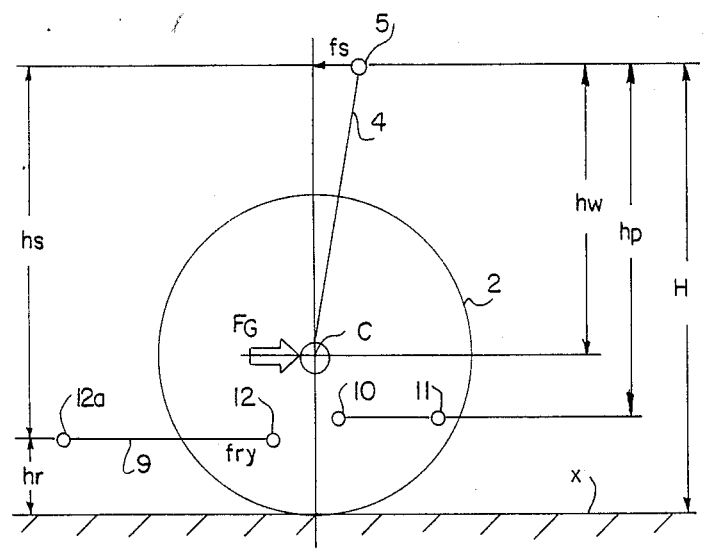

In a modification of FIGS. 8(A), 8(B) and 8(C), the strut assembly 4 is tilted inwardly and rearwardly. Therefore, the insulator 5 is positied inwardly and rearwardly shifted position than that in the foregoing first embodiment. In this arrangement, the force to be exerted on the front and rear transverse links 7 and 8 are illustrated by the following equations:

$$f_{pf} = \frac{(l \cdot \tan \theta + S_1 - S_3) \cdot f_{ry}}{l_2} \quad (21)$$

$$f_{pr} = \frac{(l_1 \cdot \tan \theta + S_1 - S_3) \cdot f_{ry}}{l_2} \quad (22)$$

Where $S_3$ represents a distance in transverse direction between a crossing point $P_3$ of an extension extending across the insulator 5 and the wheel center C and an expension of the axis of the radius-rod 9 and the insulator 5.

Figure 9A:
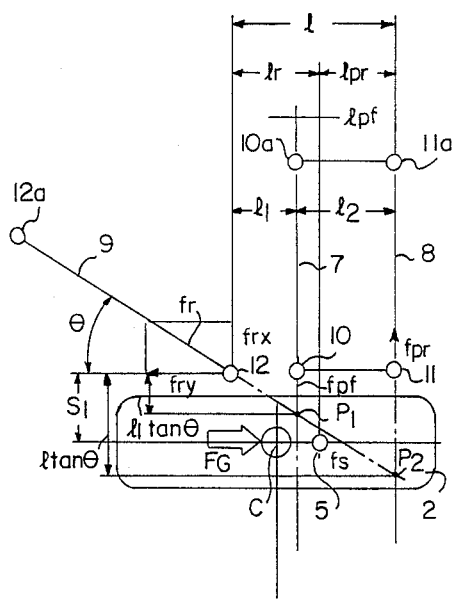
FIGS. 9(A), 9(B) and 9(C) are illustration showing another mofitication of the first embodiment of the automotive syspension system of FIG. 1.
Figure 9C:
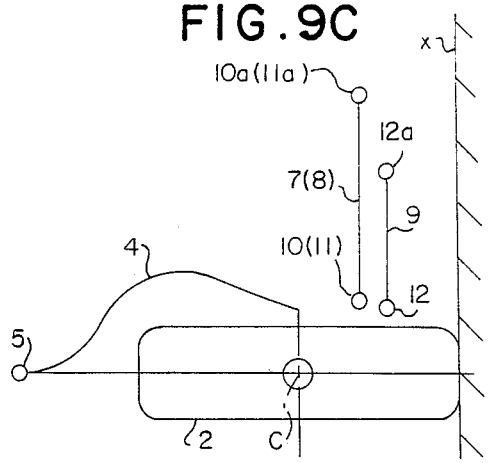
Figure 9B:
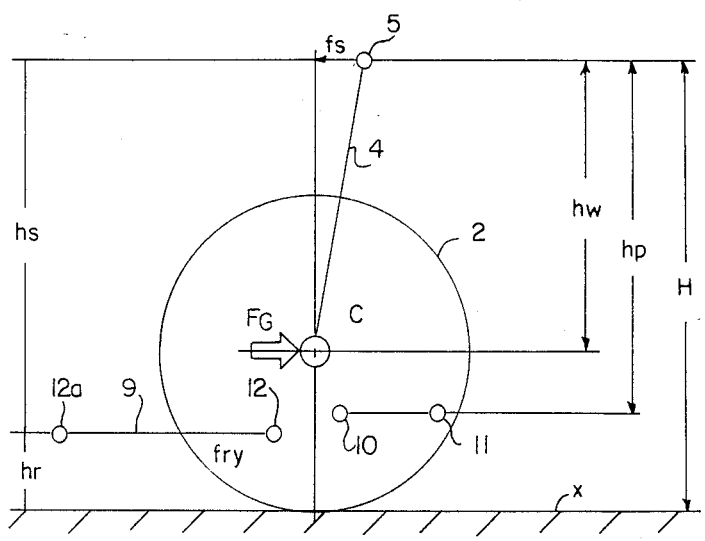

In a modification of FIGS. 9(A), 9(B) and (C), the strut assembly 4 lies on a vertical plane longitudinally extending across the wheel center C in parallel to the longitudinal axis of the vehicle. Therefore, the insulator 5 lies on the vertical plane in longitudinally in alignment with the wheel center C.

In this arrangement, the transverse forces $f_{pf}$ and $f_{pr}$ to be exerted on the front and rear transverse links 7 and 8 are illustrated by the following equations:

$$f_{pf} = \frac{(l \cdot \tan \theta + S_1) \cdot f_{ry}}{l_2} \quad (23)$$

$$f_{pr} = \frac{(l_1 \cdot \tan \theta + S_1) \cdot f_{ry}}{l_2} \quad (24)$$

Figures 10A, 10B, 10C:
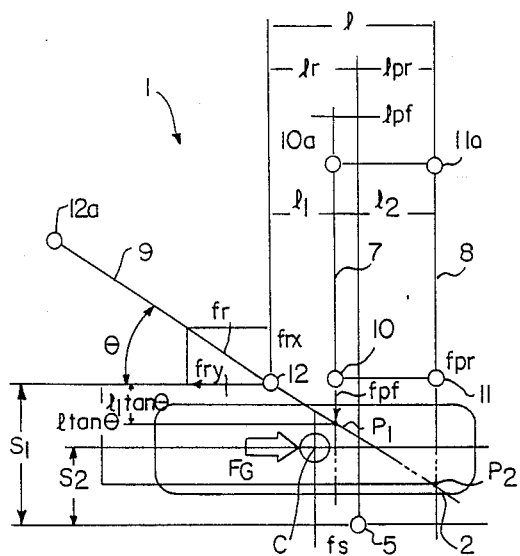
FIGS. 10(A), 10(B) and 10(C) are illustration showing a further mofitication of the first embodiment of the automotive syspension system of FIG. 1.

In a modification of FIGS. 10(A), 10(B) and 10(C), the strut assembly 4 is inclined outwardly to place the insulator 5 at a position outwardly shifted from the wheel center, in transverse direction. In this embodiment, the transverse forces $f_{pf}$ and $f_{pr}$ to be exerted on the front and rear transverse links 7 and 8 are illustrated by the following equations:

$$f_{pf} = \frac{(l \cdot \tan \theta - S_1 + S_3) \cdot f_{ry}}{l_2} \quad (25)$$

$$f_{pr} = \frac{(l_1 \cdot \tan \theta - S_1 + S_3) \cdot f_{ry}}{l_2} \quad (26)$$

In the foregoing modifications in FIGS. 8(A) through 10(C), it will be clear that suppression of toe-oput change can be achieved or toe-in change characteristics can be obtained by adjusting the tilting angle $\theta$ of the radius-rod 9.

Figure 11A:
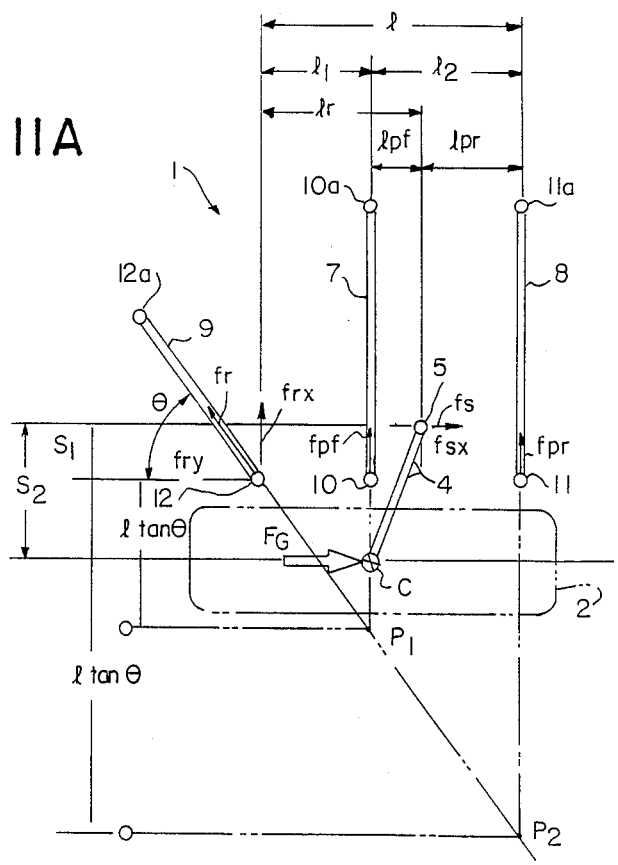
FIGS. 11(A) and 11(B) are illustrations respectively corresponding FIGS. 3 and 4, but showing the different condition in causing compliance steer in the automotive suspension system according to the invention.
Figure 11B:
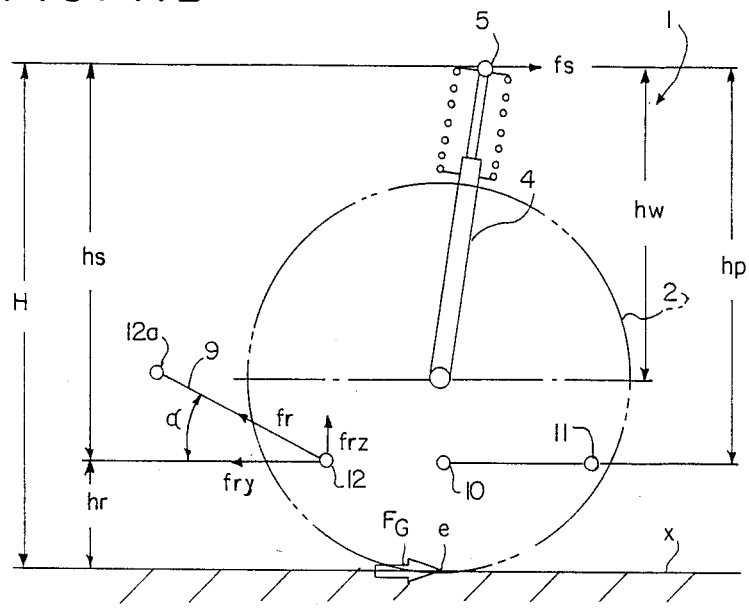

In the suspension system having a substantially identical construction as that illustrated in FIGS. 1 and 2, the longitudinal force $F_G$ tends to be exerted on the tread of the road wheel in some vehicular driving condition, such as driving passing through rough road, undulated road, braking and so forth. FIGS. 11(A) and 11(B) illustrate suspension geometry adapted to suppress toe angle change or to cause toe-in change in response to the longitudinal force $F_G$ exerted on the tread e of the road wheel 2.

In FIGS. 11(A) and 11(B)

l represents a distance in longitudinal direction between the axes of the rubber bushings 12 and 11;

$l_1$ represents a distance in longitudinal direction between the rubber bushings 12 and 10;

$l_2$ represents a distance in longitudinal direction between rubber bushings 10 and 11;

$l_{pf}$ and $l_{pr}$ respectively represent distance in longitudinal direction between the rubber bushing 10 and the insulator 5 and between the insulator 5 and the rubber bushing 11;

$S_1$ represents a distance in transverse direction between the rubber bushing 12 and the insulator 5;

$S_2$ represents a distance in transverse direction between the insulator 5 and the tread e of the road wheel 2;

H represents a distance in vertical direction from the road surface X to the insulator 5;

$h_s$ and $h_r$ respectively represent distance in vertical direction between the rubber bushing 12 and the insulator 5 and between the rubber bushing 12 and the road surface X;

$h_w$ and $h_p$ respectively represent distances in vertical direction between the insulator 5 to the wheel center C and between the insulator 5 to the rubber bushings 10 and 11;

$f_r$, $f_{pf}$, $f_{pr}$, $f_s$ and $f_{sx}$ are forces to be exerted on the radius-rod 9, front transverse link 7, rear transverse link 8, strut assembly 4 respectively.

Similarly to the foregoing first embodiment, since the radius-rod 9 inclines transversely and vertically at respective angles $\theta$ and $\alpha$, longitudinal and transverse components $f_{rx}$ and $f_{ry}$ and vertical component $f_{rz}$ are created by the force $f_r$ exerted on the radius-rod 9.

In the shown condition, since the longitudinal force is exerted on the tread e of the road wheel, which tread is in contact with the road surface, the formula (13) and (14) derived with respect to the longitudinal force to be exerted on the wheel center will be modified as follows:

$$(l \cdot \tan\theta + S_1) \geqq \qquad (26)$$

$$\left[ \frac{S_1 \cdot \tan\alpha + (h_p - h_s) \cdot \tan\theta}{h_p} \cdot l_{pr} \right] +$$

$$\left[ \frac{h_s + l_r \cdot \tan\alpha}{H} \cdot S_2 \right]$$

$$(l_1 \cdot \tan\theta + S_1) \geqq \left[ \frac{h_s + l_r \cdot \tan\alpha}{H} \cdot S_2 \right] \qquad (27)$$

$$- \left[ \frac{S_1 \cdot \tan\alpha + (h_p - h_s) \cdot \tan\theta}{h_p} \cdot l_{pf} \right]$$

As will be appreciated herefrom, by providing $(l \cdot \tan\theta + S_1)$ and $(l_1 \cdot \tan\theta + S_1)$ satisfying the foregoing formula (26) and (27), suppression of toe angle change, or more positively to cause toe-in change can be accomplished.

In another approach, a condition not to cause toe angle change can be derived with respect to the horizontal tilt angle $\theta$ of the radius-rod 9 relative to the longitudinal force $F_G$. In this view, the toe angle change will never occur as long as the transversely outward force $f_{pf}$ to be exerted on the front transverse link 7 balances with the transversely inward force $-f_{pr}$ to be exerted on the rear transverse link 8. As long as this balance is established, the condition of the transverse forces may be illustrated by:

$$f_{pf} = |-f_{pr}| \qquad (28).$$

Since the longitudinal force $F_G$ is exerted on the tread e, the foregoing formula (10) in the former embodiment may be modified as follow:

$$F_G = \frac{h_s + \tan\alpha \cdot l_r}{h_w} \qquad (29)$$

On the other hand, foregoing formula (4) and (5) in the former embodiment can be modified by utilizing the formula (29) and (12) as follows:

$$f_{pf} = \frac{\left[ l \cdot \tan\theta + S_1 - \left( \frac{S_1 \cdot \tan\alpha + (h_p - h_s) \cdot \tan\theta}{h_p} \cdot l_{pr} \right) - \frac{(h_s + l_r \cdot \tan\alpha) \cdot S_2}{H} \right] \cdot f_{ry}}{l_2} \qquad (30)$$

$$f_{pr} = \frac{\left[ \frac{S_1 \cdot \tan\alpha + (h_p - h_s)\tan\theta}{h_p} \cdot l_{pf} + l_1 \cdot \tan\theta + S_1 - \frac{(h_s + l_r \cdot \tan\alpha) \cdot S_2}{H} \right] \cdot f_{ry}}{l_2} \qquad (31)$$

by modifying the formula (30) and (31) utilizing the formula (28), there can be obtained:

$$\left[ l + l_1 + l_{pf} - l_{pr} + \frac{h_s}{h_p}(l_{pr} - l_{pf}) \right] \cdot \tan\theta = \qquad (32)$$

$$\frac{S_1 \cdot \tan\alpha}{h_p}(l_{pr} - l_{pf}) + 2\left[ \frac{(h_s + l_r \cdot \tan\alpha) \cdot S_2}{H} - S_1 \right]$$

Here, since $l - l_{pr} = l_r - l_1 + l_{pf} = l_r$, the foregoing formula (32) can be modified to:

$$\theta = \qquad (33)$$

$$\tan^{-1} \frac{\frac{S_1 \cdot \tan\alpha}{h_p}(l_{pr} = l_{pf}) + 2\left[ \frac{(h_s + l_r \cdot \tan\alpha)S_2}{H} - S_1 \right]}{2 \cdot l_r + \frac{h_s}{h_p} \cdot (l_{pr} - l_{pf})}$$

Therefore, by setting the tilting angle $\theta$ of the radius-rod 9 to satisfy the equation (33), toe angle change can be suppressed. In addition, in order to obtain toe-in change, the former equation $f_{pf} = |-f_{pr}|$ has to be modified to $f_{pf} > |-f_{pr}|$. Therefore, by setting the angle $\theta$ to be greater than that derived from the equation (33), toe-in change characteristics can be obtained.

Figure 12A:
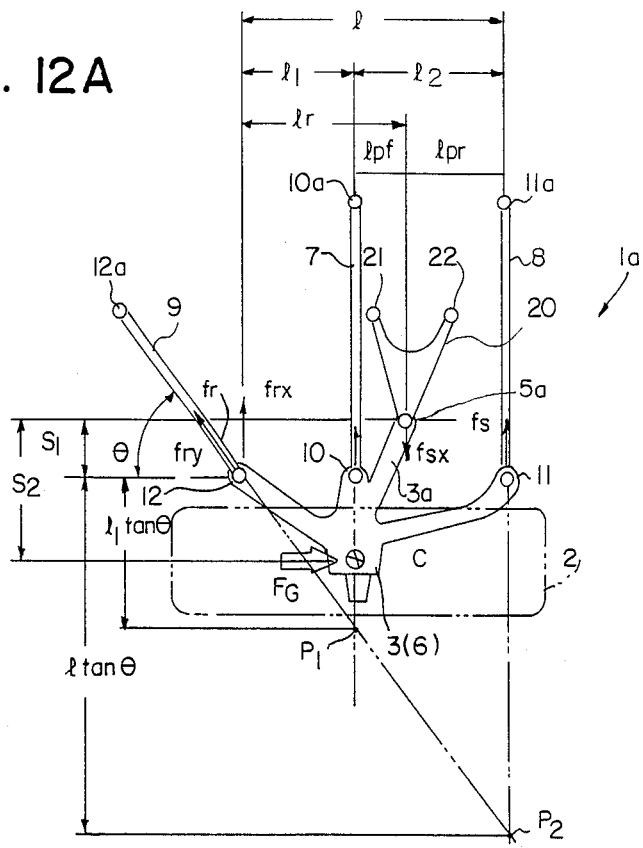
FIGS. 12(A) and 12(B) are illustrations respectively corresponding FIGS. 5 and 6, but showing the different condition in causing compliance steer in the automotive suspension system according to the invention.
Figure 12B:
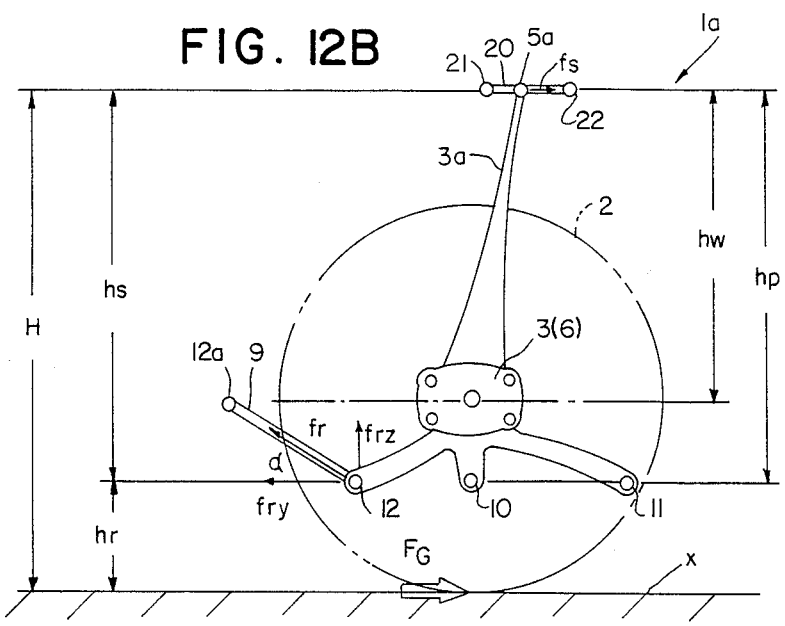

FIGS. 12(A) and 12(B) show the equivalent construction that illustrated as the second embodiment of the automotive suspension system according to the invention, but is applied the longitudinal force $F_G$ at the tread e of the road wheel. Even for this arrangement, the foregoing formula (26) and (27) are applicable for obtaining for establishing suspension geometry which can suppress toe angle change or can cause toe-in change in response to the longitudinal force exerted on the tread e of the road wheel 2.

Figure 13A:
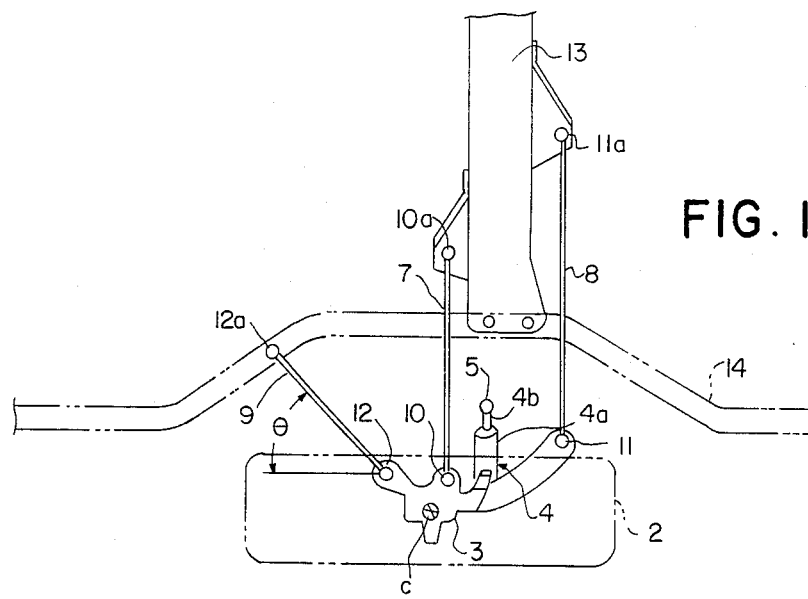
FIGS. 13(A) and 13(B) are fragmentary and explanatory illustration of the third embodiment of an automotive suspension system according to the invention.
Figure 13B:
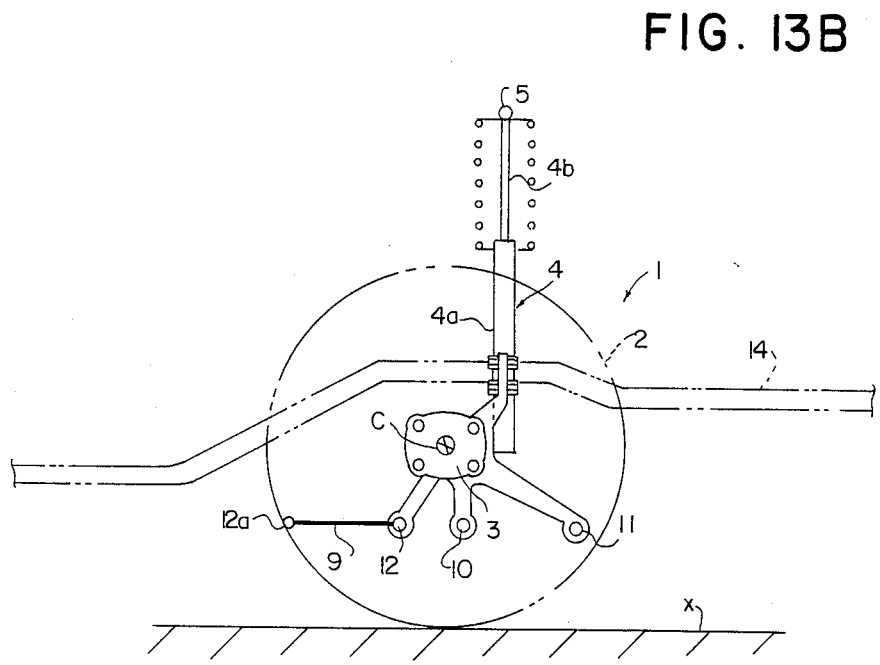

FIGS. 13(A) and 13(B) illustrates the third embodiment of an automotive suspension system according to the present invention. As will be seen from FIGS. 13(A) and 13(B), the construction of this embodiment of the suspension system is essentially same as that illustrated in FIGS. 1 and 2 as the first embodiment of the invention. However, in this embodiment, the radius-rod 9 extends on a horizontal plane which is essentially parallel to the road surface X. The geometry of the third embodiment of the suspension system will be discussed herebelow with reference to FIGS. 14(A), 14(B) and 14(C). In the shown arrangement, an axis L extending through the insulator 5 and the tread point e of the road wheel 2, which trad point is in contact with the road surface, serves as pivoting axis as the road wheel 2 vibrates in vertical direction. The axis L extends across a horizontally extending extension of the axis of the radius-rod 9 at a point g, as viewed in longitudinal direction. A point Q of the extension of the axis of the radius-rod 9 lies on a vertical plane P longitudinally extending across the point g. In the shown geometry, the point Q vertically overlaps with a point at which an extension of the front transverse link 7 passes across the vertical plane P and is oriented inside of the wheel center C. As will be seen from FIGS. 14(A) and 14(B), the insulator 5 is transversely positioned inwardly shifted position from the transverse position of the wheel center C.

In FIGS. 11(A) and 11(B)

l represents a distance in longitudinal direction between the axes of the rubber bushings 12 and 11;

$l_1$ represents a distance in longitudinal direction between the rubber bushings 12 and 10;

$l_2$ represents a distance in longitudinal direction between rubber bushings 10 and 11;

$l_{pf}$ and $l_{pr}$ respectively represent distance in longitudinal direction between the rubber bushing 10 and the insulator 5 and between the insulator 5 and the rubber bushing 11;

$S_1$ represents a distance in transverse direction between the rubber bushing 12 and the insulator 5;

$S_2$ represents a distance in transverse direction between the insulator 5 and the tread e of the road wheel 2;

$S_3$ represents a distance in transverse direction between the insulator 5 and the vertical plane P H represents a distance in vertical direction from the road surface X to the insulator 5;

$h_s$ and $h_r$ respectivelly represent distance in vertical direction between the rubber bushing 12 and the insulator 5 and between the rubber bushing 12 and the road surface X;

$h_w$ and $h_p$ respectively represent distances in vertical direction between the insulator 5 to the wheel center C and between the insulator 5 to the rubber bushings 10 and 11;

$f_r$, $f_{pf}$, $f_{pr}$, $f_s$ and $f_{sx}$ are forces to be exerted on the radius-rod 9, front transverse link 7, rear transverse link 8, strut assembly 4 respectively.

Similarly to the foregoing first embodiment, since the radius-rod 9 inclines transversely at the angle $\theta$, longitudinal and transverse components $f_{rx}$ and $f_{ry}$ are created by the force $f_r$ exerted on the radius-rod 9. However, in the geometry of the third embodiment, since the radius-rod 9 extends horizontally, the vertical component which is created in the foremer embodiments will not be created in response to the longitudinal force $F_G$.

From the condiction set forth above, the balance of pivotal moment around the insulator 5 of the strut asembly 4 can be illustrated by the following equation:

$$F_G = \frac{h_s}{H} \cdot f_{ry} \tag{34}$$

Here, when $h_s/H = S_3/S_2$, $S_3$ can be illustrated as:

$$S_3 = (h_s/H) \cdot S_2 \tag{35}$$

Further, the moment around the insulator may be illustrated by:

$$-l_{pf} f_{pf} - l_{pr} f_{pr} + l_r f_{rx} + S_1 \cdot f_{ry} - S_2 \cdot F_G = 0 \tag{36}$$

The balance of the transverse force can be illustrated by:

$$f_{pf} = f_{rx} + f_{pr} \tag{37}$$

where $$f_{rx} = f_{ry} \tan \theta \tag{38}$$

The equation (36) can be modified utilizing the equations (37) and (38) as follow:

$$f_{pf} = \frac{l \cdot \tan \theta + S_1) \cdot f_{ry} - F_G \cdot S_2}{l_2} \tag{39}$$

$$f_{pr} = \frac{l_1 \cdot \tan \theta + S_1) \cdot f_{ry} - F_G \cdot S_2}{l_2} \tag{40}$$

The equations (39) and (40) are further modified by utilizing the formula (34) as follows:

$$f_{pf} = \frac{(l \cdot \tan \theta + S_1 - S_3) \cdot f_{ry}}{l_2} \tag{41}$$

$$f_{pr} = \frac{(l_1 \cdot \tan \theta + S_1 - S_3) \cdot f_{ry}}{l_2} \tag{42}$$

Though the specific geometory of the suspension system has been discussed with respect to the third embodiment of the invention, various geometories can be taken to formulate the automotive suspension systems. For instance, though the shown embodiment orients the insulator 5 at the inwardly offset position from the wheel center, it would be possible to place the insulator 5 in transversely alignment with the wheel center and in outwardly offset position from the wheel center. Furthermore, the position of the point Q is not limited to the aforementioned specific position, at which the point is oriented in vertically overlapping position with the crossing point of the extension of the axis of the front transverse link to the vertical plane P. The position of the point Q may be varied by varying the angle $\theta$ of the radius-rod 9, vertical position of the radius-rod, arrangement of the front and rear transverse links and so forth.

FIGS. 15(A), 15(B), 15(C) and 15(D) illustrate variations of suspension geometries which could be taken. In FIGS. 15(A), 15(B), 15(C) and 15(D), columns I show the suspension geometries in which the insulators 5 are placed inside of the wheel center column II show the suspension geometries in which the insulators 5 are placed on a longitudinal and vertical plane extending through the wheel center and column III show the suspension geometries in which the insulators are placed outside of the wheel center. FIGS. 15(A), 15(B), 15(C) and 15(D) are classified in view of the orientation of the points Q. Namely, in the geometries in FIG. 15(A), the points Q are oriented frontwardly offset position from the extension of the axis of the front transverse link 7; in the geometries in FIG. 15(B), the points Q are oriented at position vertically overlapping with the extension of the axis of the front transverse link; in the geometries of FIG. 15(C), the points Q are oritented at intermediate positions between extensions of axes of the front and rear transverse links 7 and 8; and in the geometry of FIG. 15(D), the points Q are oritented rearwardly offset position from the extension of the axis of the rear transverse link. Among the variations illustrated in FIGS. 15(A), 15(B), 15(C) and 15(D), the one shown in column I of FIG. 15 corresponds to that discussed with reference to FIGS. 13(A), 13(B) and 14(A), 14(B), 14(C).

The transverse forces to be exerted on the front and rear transverse links of the suspensions in column I of respective FIGS. 15(A), 15(B), 15(C) and 15(D) is obtainable from the foregoing equations (41) and (42). On the other hand, the transverse forces to be exerted on the front and rear transverse links of the suspensions in column II of respective FIGS. 15(A), 15(B), 15(C) and 15(D) is obtainable from:

$$f_{pf} = \frac{(l \cdot \tan \theta + S_1) \cdot f_{ry}}{l_2} \quad (43)$$

$$f_{pr} = \frac{(l_1 \cdot \tan \theta + S_1) \cdot f_{ry}}{l_2} \quad (44)$$

Furthermore, the transverse forces to be exerted on the front and rear transverse links of the suspensions in column III of respective FIGS. 15(A), 15(B), 15(C) and 15(D) is obtainable from:

$$f_{pf} = \frac{(l \cdot \tan \theta - S_1 + S_3) \cdot f_{ry}}{l_2} \quad (45)$$

$$f_{pr} = \frac{(l_1 \cdot \tan \theta - S_1 + S_3) \cdot f_{ry}}{l_2} \quad (46)$$

Figure 14A:
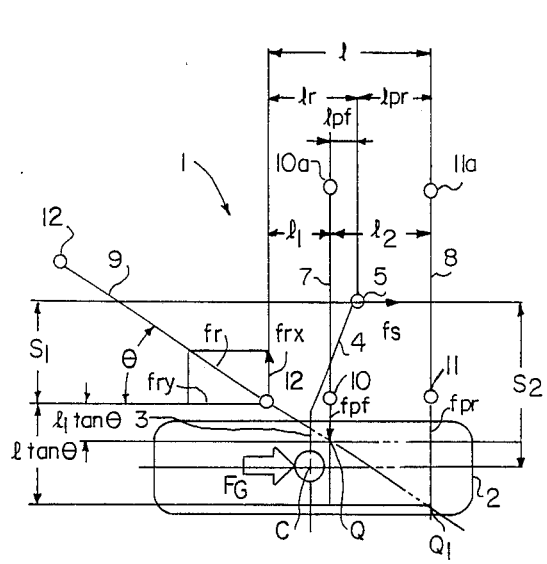
FIGS. 14(A), 14(B) and 14(C) are explanatory illustration showing geometry of the fourth embodiment of the automotive syspension system of FIG. 13.
Figure 14B:
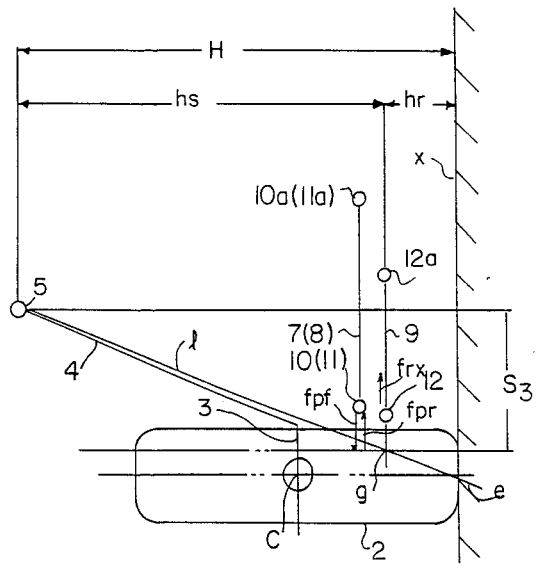
Figure 14C:
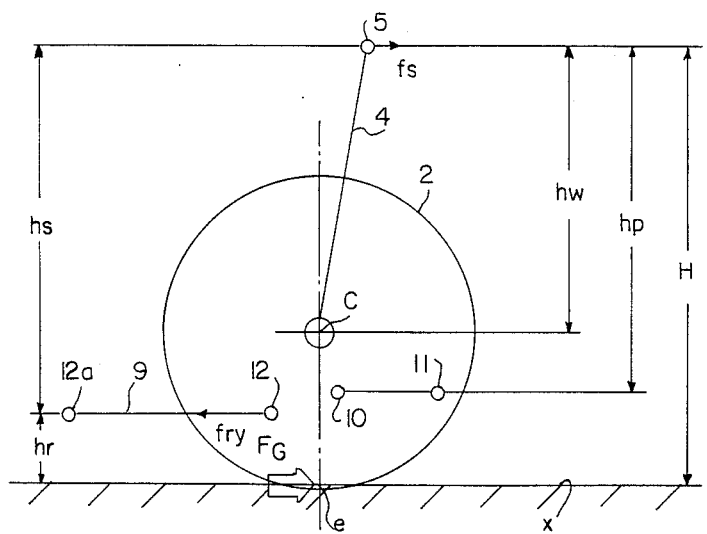

From the above-discussion and with reference to FIGS. 15(A), 15(B), 15(C) and 15(D), the toe angle change in respective suspension geometries will be discussed herebelow. In the equations (41), (43) and (45) for deriving the transverse forces $f_{pf}$ to be exerted on the front transverse links 7, (l·tan $\theta$) represents a distance in transverse direction between the rubber bushing 12 of ther radius-rod 9 to a point $Q_1$ where the extension of the axis of the radius-rod 9 crosses the extension of the axis of the rear transverse link 8, as shown in FIG. 14(A). On the other hand, in the equations (42), (44) and (46) for deriving the transverse forces $f_{pr}$ to be exerted on the rear transverse links 8, ($l_1$·tan $\theta$) represents a distance between the rubber bushing 12 and the point Q.

From this, it would be appreciated that for the suspension geometries in FIG. 15(A), the transverse force $f_{pf}$ subjects outwardly ($f_{pf}>0$) to the front transverse links 7. On the other hand, transverse force $f_{pr}$ subjects inwardly ($f_{pr}<0$) to the rear transverse links 8. Therefore, as set out with respect to the former embodiment, the toe angle change to be occured in response to the longitudinal force $F_G$ on the tread e of the road wheel 2 will have toe-in characteristics in compliance steer.

Similarly, in the suspension geometries of FIG. 15(B), though no transverse force ($f_{pr}=0$) is exerted on the rear transverse links 8, toe-in change characteristics in compliance steer can be provided by the transverse force ($f_{pf}$) exerted on the front transverse links 7 in outward direction. On the other hand, in the suspension geometries of FIG. 15(C), both of the transverse forces ($f_{pf}$ and $f_{pr}$) exerts on the front and rear transverse links 7 and 8 in outward directions. In this case, toe angle change characteristics may be determined by load distribution between the front and rear transverse links and elastic characteristics of the bushings 10, 10a and 11, 11a. Therefore, by providing greater elastic characteristics for the rubber bushings 11 and 11a than that of the ruber bushings 10 and 11a, toe-in change characteristics in compliance steer can be obtained.

In the suspension geometries of FIG. 15(D), since the transverse force ($f_{pf}<0$) on the front transverse link 7 is directed inwardly and the transverse force ($f_{pr}>0$) on the rear transverse link 8 is directed outwardly, toe angle change characteristics becomes toe-out. Therefore, the geometries in FIG. 15(D) cannot satisfy the requirement for the present invention.

As will be appreciated herefrom, according to the invention, by setting the point Q at least the front side of the extension of the axis of the rear transverse link 8, toe-in characteristics can be obtained. More positively, by providing the suspension geometries to have the point Q frontwardly offsetting from the extension of the axis of the front transverse link or on the same longitudinal oritentation to that of the extension of the axis of the front transverse link, toe-in change in compliance characteristics can be assured.

Figure 16A:
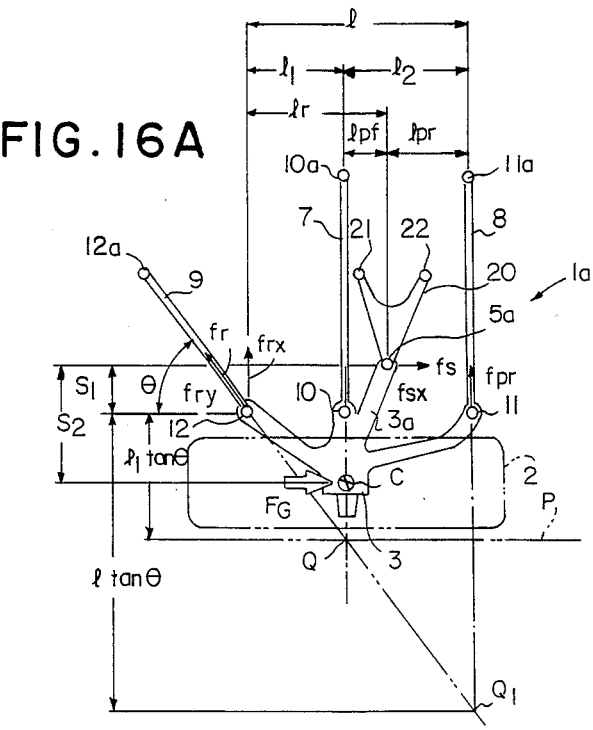
FIGS. 16(A) and 16(B) are fragmentary and explanatory illustration of the fourth embodiment of an automotive suspension system according to the invention.
Figure 16B:
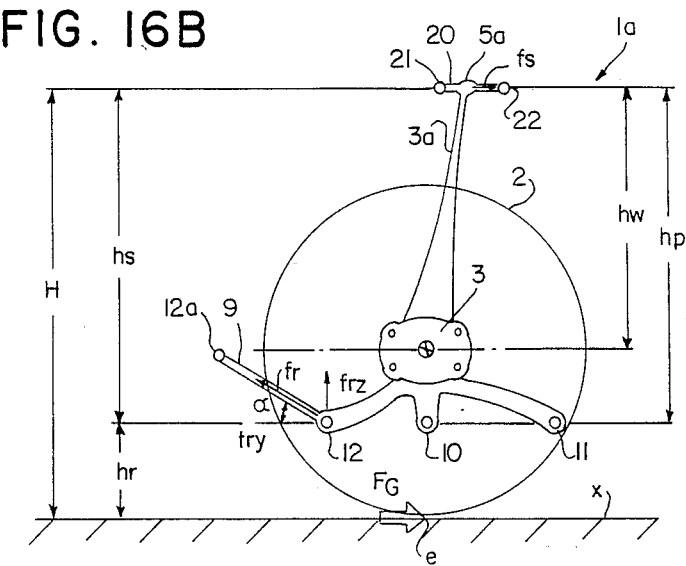

FIGS. 16(A) and 16(B) show the fourth embodiment of the automotive auapension system which is applied for the double wishbone type suspension. The construction of the fourth embodiment of the suspension system is substantially the same as that in FIGS. 6 and 7. Geometry of this suspension system will be discussed with reference to FIGS. 17(A), 17(B) and 17(C). In FIGS. 17(A), 17(B), 17(C) and 17(D), it is assumed that the longitudinal force $F_G$ due to engine braking and so forth, is exerted on the wheel center to cause compliance steer. In the shown geometry, the line L' extends through the insulator 5 and the wheel center C on which the longitudinal force $F_G$ is exerted. The line L' has a point g at which the extension of line L' pass across the extension of the axis of the radius-rod 9, as viewed vertically. The extension of the axis of the radius-rod 9 has the point Q lyin on the vertical plane P. For this arrangement, the transverse forces $f_{pf}$ and $f_{pr}$ respectively exerted on the front and rear transverse links 7 and 8 are derived from the same equations of equations (41) and (42).

Figure 17A:
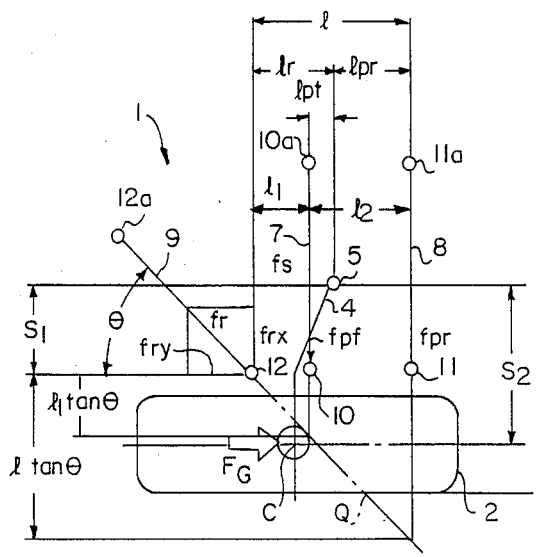
FIGS. 17(A), 17(B) and 17(C) are explanatory illustration showing geometry of the fourth embodiment of the automotive syspension system of FIG. 16.
Figure 17B:
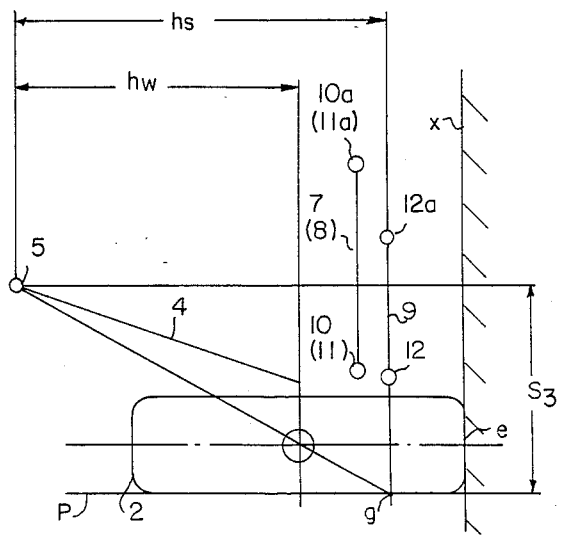
Figure 17C:
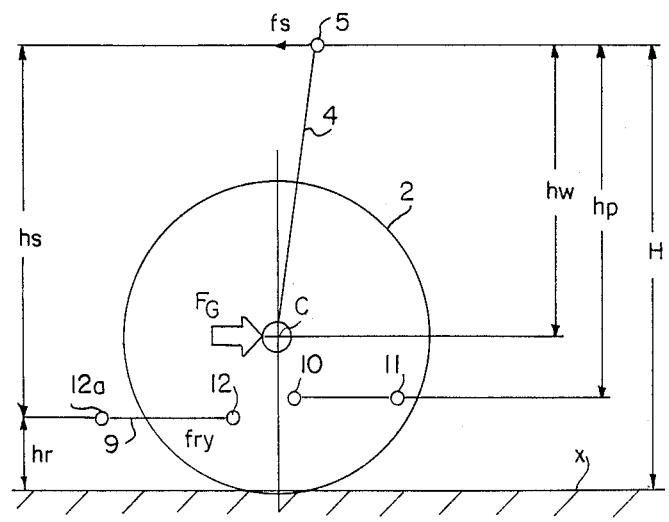

Variations of the suspension geometries as derived by modifying the geometry of FIG. 17(A), 17(B) and 17(C) will be shown in FIGS. 18(A), 18(B), 18(C) and 18(D). In FIGS. 18(A), 18(B), 18(C) and 18(D), the variations of suspension geometries are classified in the identical manner as that disclosed with respect to FIGS. 15(A), 15(B), 15(C) and 15(D).

As will be seen from FIGS. 18(A), 18(B), 18(C) and 18(D), according to the shown embodiment, by setting the point Q at least the front side of the extension of the axis of the rear transverse link 8, toe-in characteristics can be obtained. More positively, by providing the suspension geometries to have the point Q frontwardly offsetting from the extension of the axis of the front transverse link or on the same longitudinal orientation to that of the extension of the axis of the front transverse link, toe-in change in compliance characteristics can be assured.

It should be appreciated that, though the preferred embodiments of the automotive suspension systems having parallel transverse links are disclosed hereabove in order to disclose the principle of the invention, the present invention will also be appliable for the suspension systems having transverse links arranged in non-parallel fashion.

What is claimed is:

1. An automotive suspension system comprising:
   a first member rotatably supporting a road wheel;
   a second member connecting said first member to a vehicle body, said second member having a first end rigidly connected to said first member and a second end connected to said vehicle body via a first elastic member, said second member having an axis crossing said vehicle body at a first point;
   a plurality of transversely extending third members including a most forward and most rearward third member, said third members being substantially parallel to each other, each of said third members being connected to said first member at a first end and to said vehicle body at a second end for determining transverse position of said first member, each of said third members being connected to said first member and said vehicle body via second elastic members provided at said first and second ends thereof; and
   a fourth member having a first end connected to said first member and a second end connected to said vehicle body for determining longitudinal position of said first member, said second end being so oriented to direct an axis of said fourth member to cross transversely extending axes of respective third members at positions transversely shifted from said first point so that an inward force exerted on said first elastic member by said second end of said second member is greater than or equal to the inward force to be exerted on one of said second elastic members which is associated with the second end of the most rearward of said third members, thereby suppressing toe-out change in compliance steer.

2. An automotive suspension system as set forth in claim 1, wherein said fourth member is are so directed as to suppress toe angle change or to cause toe-in change in compliance steer caused by exerting longitudinal force on a wheel center about which said road wheel rotates.

3. An automotive suspension system as set forth in claim 1, wherein said fourth member is so directed as to suppress toe angle change or to cause toe-in change in compliance steer caused by exerting longitudinal force on a wheel tread at which said road wheel contacts with a road surface.

4. An automotive suspension system as set forth in claim 1 wherein said third members comprise front and rear links extending essentially in transverse directions, and said fourth member is so oriented to direct said axis thereof to cross with a line extending through said first point and a point on which said longitudinal force is exerted at a longitudinal position in front of an extension of an axis of said rear link.

5. An automotive suspension system comprising:
   a wheel supporting member rotatably supporting a road wheel;
   a first link member connecting said wheel-supporting member to a vehicle body, said first link member having a first end rigidly connected to said wheel-supporting member and a second end connected to said vehicle body via a first elastic member, said first link member having an axis crossing said vehicle body at a first point;
   a second link member having an axis extending transversely and essentially perpendicularly to a longitudinal axis of the vehicle body, said second link member being connected to said wheel-supporting member at a first end and to said vehicle body at a second end for determining transverse position of said wheel-supporting member, said second link member being connected to said wheel-supporting member and said vehicle body via second elastic members provided at said first and second ends of said second link member;
   a third link member having an axis extending transversely and essentially perpendicularly to a longitudinal axis of the vehicle body, said third link member being connected to said wheel-supporting member at a first end and to said vehicle body at a second end for determining transverse position of said wheel-supporting member, said third link member being connected to said wheel-supporting member and said vehicle body via third elastic members provided at said first and second ends thereof, said third link member being located longitudinally rearward of said second link member;
   a fourth link member extending obliquely relative to said transversely extending axes of said second and third link members and having a first end connected to said wheel-supporting member and a second end connected to said vehicle body for determining longitudinal position of said wheel-supporting member, said second end of said fourth link member oriented so as to direct an axis of said fourth link member to cross transversely extending axes of respective second and third link members at positions transversely shifted from said first point so that the inward force to be exerted on said second elastic member of said second end of said second link member is held greater than or equal to the inward force to be exerted on one of said third elastic members which is associated with the second end of said third link member, thereby suppressing toe out change in compliance steer.

6. An automotive suspension system comprising:
   a wheel supporting member rotatably supporting a road wheel;
   a first link member connecting said wheel-supporting member to a vehicle body, said first link member having a first end rigidly connected to said wheel-supporting member and a second end connected to said vehicle body via a first elastic member, said first link member having an axis crossing said vehicle body at a first point;
   a second link member having an axis extending transversely and essentially perpendicularly to a longitudinal axis of the vehicle body, said second link member being connected to said wheel-supporting member at a first end and to said vehicle body at a second end for determining transverse position of said wheel-supporting member, said second link member being connected to said wheel-supporting member and said vehicle body via second elastic members provided at said first and second ends of said second link member;

a third link member having an axis extending transversely and essentially perpendicularly to a longitudinal axis of the vehicle body, said third link member being connected to said wheel-supporting member at a first end and to said vehicle body at a second end for determining transverse position of said wheel-supporting member, said third link member being connected to said wheel-supporting member and said vehicle body via third elastic members provided at said first and second ends thereof, said third link member being oriented at a longitudinally rearward position relative to said second link member;

a fourth link member extending with an axis at an oblique angle relative to said transversely extending axes of said second and third link members, the obliqueness of said angle of said axis of said fourth link member being so selected as to distribute an inward component of a longitudinal force exerted on the wheel center to said second link member which is greater than or equal to an inward component of longitudinal force distributed to said said third link member to suppress toe-out change in compliance steer.

7. An automotive suspension system comprising:

a wheel supporting member rotatably supporting a road wheel;

a first link member connecting said wheel-supporting member to a vehicle body, said first link member having a first end rigidly connected to said wheel-supporting member and a second end connected to said vehicle body via a first elastic member, said first link member having an axis crossing said vehicle body at a first point;

a second link member having an axis extending transversely and essentially perpendicularly to a longitudinal axis of the vehicle body, said second link member being connected to said wheel-supporting member at a first end and to said vehicle body at a second end for determining transverse position of said wheel-supporting member, said second link member being connected to said wheel-supporting member and said vehicle body via second elastic members provided at said first and second ends of said second link member;

a third link member having an axis extending transversely and essentially perpendicularly to a longitudinal axis of the vehicle body, said third link member being connected to said wheel-supporting member at a first end and to said vehicle body at a second end for determining transverse position of said wheel-supporting member, said third link member being connected to said wheel-supporting member and said vehicle body via third elastic members provided at said first and second ends thereof, said third link member being oriented at a longitudinally rearward position relative to said second link member;

a fourth link member extending with an axis at an oblique angle relative to said transversely extending axes of said second and third link members, the obliqueness of said angle of said axis of said fourth link member being so selected as to cause compliance deformation of said second elastic member of said second link member in response to an inward component of a longitudinal force to be exerted on the wheel center of a magnitude greater than or equal to the compliance deformation of said third elastic member of said third link member to suppress toe angle change or to cause toe-in change in compliance steer.

8. An automotive suspension system comprising:

a wheel supporting member rotatably supporting a road wheel;

a first link member connecting said wheel-supporting member to a vehicle body, said first link member having a first end rigidly connected to said wheel-supporting member and a second end connected to said vehicle body via a first elastic member, said first link member having an axis crossing said vehicle body at a first point;

a second link member having an axis extending transversely and essentially perpendicularly to a longitudinal axis of the vehicle body, said second link member being connected to said wheel-supporting member at a first end and to said vehicle body at a second end for determining transverse position of said wheel-supporting member, said second link member being connected to said wheel-supporting member and said vehicle body via second elastic members provided at said first and second ends of said second link member;

a third link member having an axis extending transversely and essentially perpendicularly to a longitudinal axis of the vehicle body, said third link member being connected to said wheel-supporting member at a first end and to said vehicle body at a second end for determining transverse position of said wheel-supporting member, said third link member being connected to said wheel-supporting member and said vehicle body via third elastic members provided at said first and second ends thereof, said third link member being oriented at a longitudinally rearward position relative to said second link member;

a fourth link member extending with an axis at an oblique angle relative to said transversely extending axes of said second and third link members, the obliqueness of said angle of said axis of said fourth link member being so selected as to generate a rotational movement for causing angular displacement of said wheel-supporting member about the axis of said first link member in a direction causing toe change in response to a longitudinal force exerted on the wheel center to cause toe-in change in compliance steer.

9. An automotive suspension system comprising:

a wheel supporting member rotatably supporting a road wheel;

a first link member connecting said wheel-supporting member to a vehicle body, said first link member having a first end rigidly connected to said wheel-supporting member and a second end connected to said vehicle body via a first elastic member, said first link member having an axis crossing said vehicle body at a first point;

a second link member having an axis extending transversely and essentially perpendicularly to a longitudinal axis of the vehicle body, said second link member being connected to said wheel-supporting member at a first end and to said vehicle body at a second end for determining transverse position of said wheel-supporting member, said second link member being connected to said wheel-supporting member and said vehicle body via second elastic members provided at said first and second ends of said second link member;

a third link member having an axis extending transversely and essentially perpendicularly to a longitudinal axis of the vehicle body, said third link member being connected to said wheel-supporting member at a first end and to said vehicle body at a second end for determining transverse position of said wheel-supporting member, said third link member being connected to said wheel-supporting member and said vehicle body via third elastic members provided at said first and second ends thereof, said third link member being oriented at a longitudinally rearward position relative to said second link member;

a fourth link member extending with an axis at an oblique angle relative to said transversely extending axes of said second and third link members, the obliqueness of said angle of said axis of said fourth link member being so selected as to result in rotational movement for causing angular displacement of said wheel-supporting member about the axis of said first link member in a direction causing toe-out change in response to a longitudinal force exerted on the wheel center to maintain steering characteristics at essential neutral steer in compliance steer.

* * * * *